US011811701B2

(12) United States Patent
Yang et al.

(10) Patent No.: US 11,811,701 B2
(45) Date of Patent: Nov. 7, 2023

(54) FACILITATING MULTIPLEXING OF DOWNLINK GRANT-TRIGGERED APERIODIC CHANNEL STATE INFORMATION REPORTS ON AN UPLINK CONTROL CHANNEL

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Wanshi Chen, San Diego, CA (US); Seyedkianoush Hosseini, San Diego, CA (US); Tingfang Ji, San Diego, CA (US); Hwan Joon Kwon, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/393,318

(22) Filed: Aug. 3, 2021

(65) Prior Publication Data
US 2022/0045829 A1    Feb. 10, 2022

Related U.S. Application Data

(60) Provisional application No. 63/063,150, filed on Aug. 7, 2020.

(51) Int. Cl.
*H04L 5/00* (2006.01)
*H04W 72/23* (2023.01)

(52) U.S. Cl.
CPC ........... *H04L 5/0057* (2013.01); *H04W 72/23* (2023.01)

(58) Field of Classification Search
CPC ............................ H04L 5/0057; H04W 72/23
(Continued)

(56) References Cited

U.S. PATENT DOCUMENTS

| 2020/0008090 | A1* | 1/2020 | Chen | H04W 72/23 |
| 2020/0112415 | A1* | 4/2020 | Huang | H04L 5/0055 |

FOREIGN PATENT DOCUMENTS

| CN | 110351846 A | 10/2019 |

OTHER PUBLICATIONS

NOKIA., et al., "Remaining Details for CSI Reporting on PUCCH", 3GPP Draft, 3GPP TSG RAN WG1 Meeting AH 1801, R1-1800744, 3rd Generation Partnership Project (3GPP), Mobile Competence Centre, 650, Route Des Lucioles, F-06921 Sophia-Antipolis Cedex, France, vol. RAN WG1. No. Vancouver, Canada, Jan. 22, 2018-Jan. 26, 2018 Jan. 12, 2018 (Jan. 12, 2018), 5 Pages, Retrieved from the Internet:URL:http://www.3gpp.org/ftp/tsg%5Fran/WG1%5FRL1/TSGR1%5FAH/NR%5FAH%5F1801/Docs/ [retrieved on Jan. 12, 2018] Sections 2, 2.3, 2 4, Paragraph [02.4].

(Continued)

*Primary Examiner* — Christopher R Crompton
(74) *Attorney, Agent, or Firm* — Procopio, Cory, Hargreaves & Savitch LLP

(57) ABSTRACT

Apparatus, methods, and computer-readable media for facilitating multiplexing of downlink grant-triggered aperiodic channel state information reports on an uplink control channel are disclosed herein. An example method for wireless communication at a UE includes receiving scheduling to provide multiple A-CSI reports while foregoing A-CSI multiplexing, the scheduling for up to two A-CSI reports in a same slot for the UE, and the multiple A-CSI reports being non-overlapping in time in the same slot. The example method also includes transmitting the multiple A-CSI (Continued)

reports to a base station in respective PUCCH in the same slot and while foregoing CSI multiplexing.

30 Claims, 22 Drawing Sheets

(58) Field of Classification Search
USPC .......................................................... 370/329
See application file for complete search history.

(56) References Cited

OTHER PUBLICATIONS

Partial International Search Report—PCT/US2021/044570—ISA/EPO—dated Nov. 11, 2021.
International Search Report and Written Opinion—PCT/US2021/044570 ISA/EPO—dated Feb. 18, 2022.
Qualcomm Incorporated: "Remaining Issues on CA", 3GPP Draft, R1-1804810, 3GPP TSG RAN WG1 Meeting #92bis, Remaining Issues on CA, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427077, pp. 1-11, Retrieved from the Internet: URL: http://www.3gpp.org/ftp/Meetings%5F3GPP%5FSYNC/RAN1/Docs/[retrieved on Apr. 15, 2018] paragraphs [2.1.3], [2.1.4].

* cited by examiner

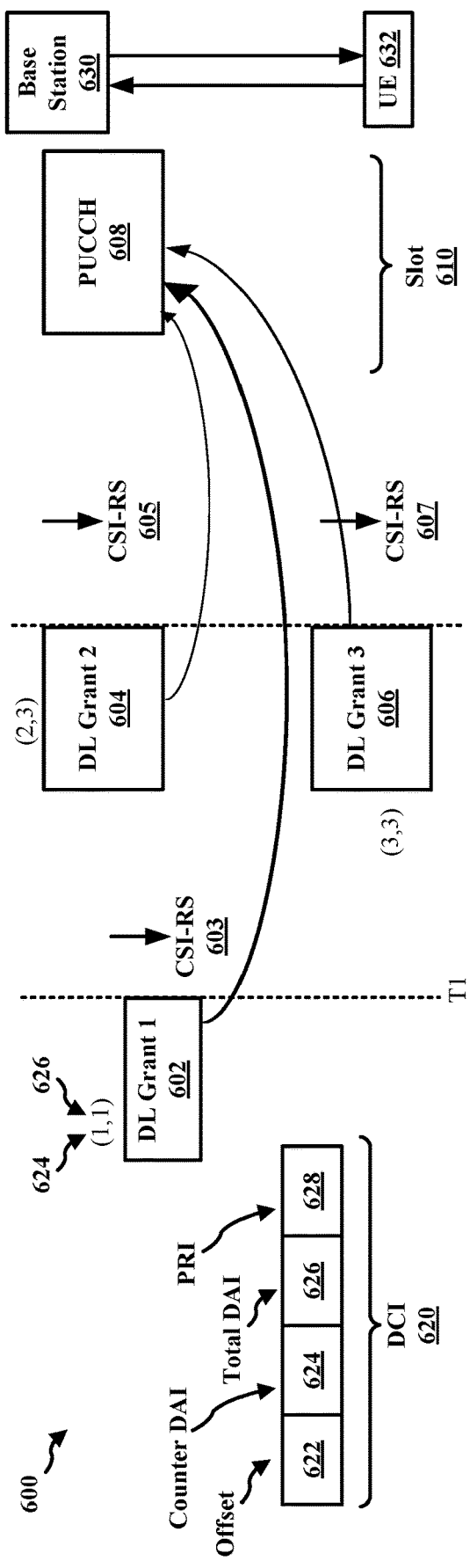
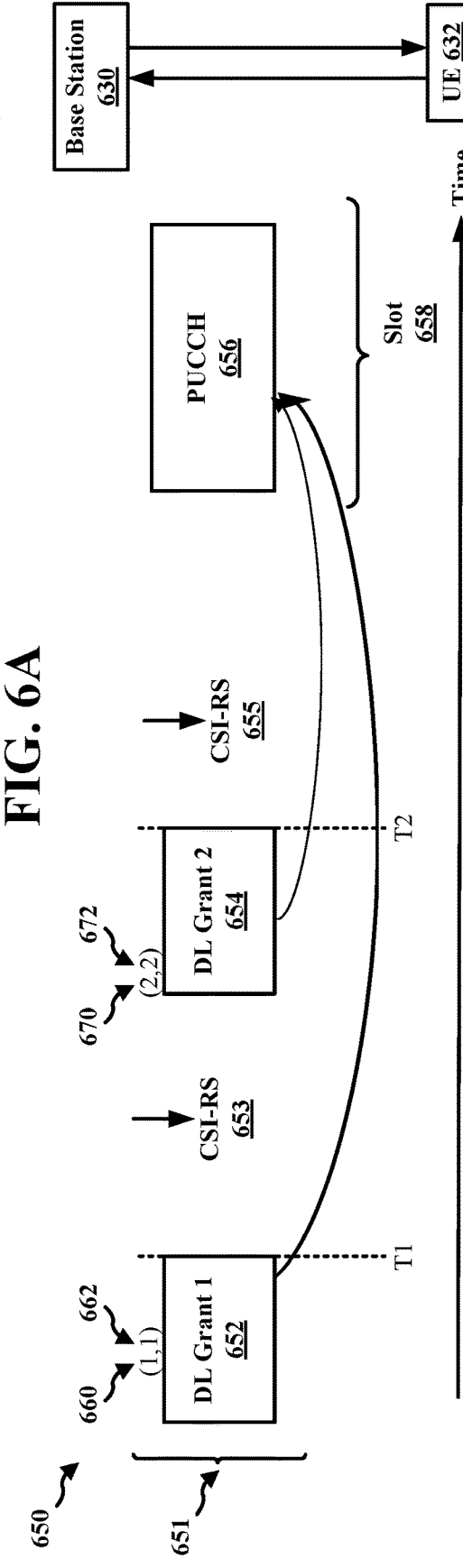
FIG. 6A
FIG. 6B

FACILITATING MULTIPLEXING OF DOWNLINK GRANT-TRIGGERED APERIODIC CHANNEL STATE INFORMATION REPORTS ON AN UPLINK CONTROL CHANNEL

CROSS REFERENCE TO RELATED APPLICATION(S)

This application claims the benefit of and priority to U.S. Provisional Application Ser. No. 63/063,150, entitled "METHODS AND APPARATUS TO FACILITATE MULTIPLEXING OF DOWNLINK GRANT-TRIGGERED APERIODIC CHANNEL STATE INFORMATION REPORTS ON AN UPLINK CONTROL CHANNEL," and filed on Aug. 7, 2020, which is expressly incorporated by reference herein in its entirety.

TECHNICAL FIELD

The present disclosure relates generally to communication systems, and more particularly, to wireless communications using channel state information feedback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus receives scheduling to provide multiple aperiodic channel state information (A-CSI) reports while foregoing A-CSI multiplexing, the scheduling for up to two A-CSI reports in a same slot for the UE, and the multiple A-CSI reports being non-overlapping in time in the same slot. Additionally, the example apparatus transmits the multiple A-CSI reports to a base station in respective physical uplink control channels (PUCCH) in the same slot and while foregoing channel state information (CSI) multiplexing.

In another aspect of the disclosure, a method, a computer-readable medium, and an apparatus are provided for wireless communication at a UE. An example apparatus receives a downlink grant scheduling the UE to provide an A-CSI report, the downlink grant including at least one of a counter downlink assignment indicator (DAI) associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. Additionally, the example apparatus transmits a CSI report to a base station in a PUCCH based on the downlink grant.

In another aspect of the disclosure, a method, a computer-readable medium, and an apparatus are provided for wireless communication at a base station. An example apparatus schedules a UE to provide multiple A-CSI reports while foregoing A-CSI multiplexing. The example apparatus also schedules up to two A-CSI reports in a same slot for the UE, the multiple A-CSI reports being non-overlapping in time in the same slot. Additionally, the example apparatus receives, from the UE, the multiple A-CSI reports in respective PUCCH.

In another aspect of the disclosure, a method, a computer-readable medium, and an apparatus are provided for wireless communication at a base station. An example apparatus transmits a downlink grant scheduling a UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. Additionally, the example apparatus receives a CSI report from the UE in a PUCCH based on the downlink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A illustrates an example flow of a UE receiving multiple downlink grants in a carrier aggregation, in accordance with various aspects of the present disclosure.

FIG. 6B illustrates an example flow of a UE receiving multiple downlink grants for a same carrier, in accordance with various aspects of the present disclosure.

DETAILED DESCRIPTION

Figure 1:
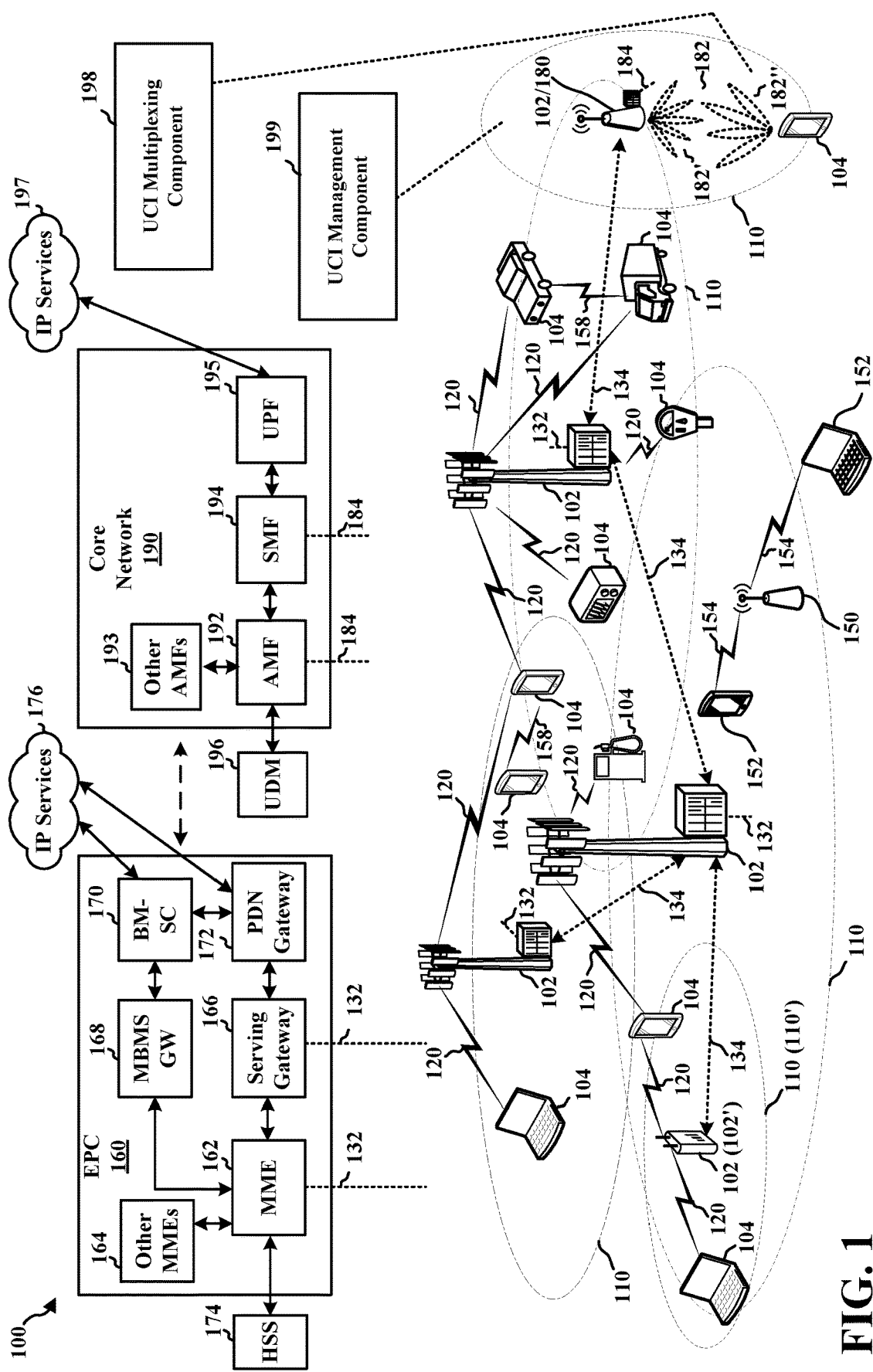
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A UE may provide feedback to a base station. For example, a UE may transmit uplink control information (UCI), such as channel state information (CSI) feedback and/or hybrid automatic repeat request (HARM) feedback, using an uplink control channel (e.g., a physical uplink control channel (PUCCH)). In some examples, the UE may be scheduled to transmit multiple transmissions in a same slot. However, the UE may be prevented from transmitting two transmissions that overlap in time. For example, the UE may be capable of transmitting one PUCCH or two PUCCH within a same slot, and when transmitting two PUCCH within a same slot, the two PUCCH should occupy different symbols within the same slot so as to not overlap in time. When two resources occupy the same symbols within a slot, the two resources are said to collide.

Examples disclosed herein provide techniques for resolving such collisions. For example, examples disclosed herein provide techniques for indicating a PUCCH resource for transmitting aperiodic CSI reports. In some examples, the PUCCH resource may be indicated within a downlink grant. In some examples, the PUCCH resource may be derived based on information provided in the downlink grant.

In some examples, different types of feedback may be scheduled for a same slot. For example, a UE may be scheduled to transmit a first PUCCH resource associated with aperiodic CSI feedback and a second PUCCH resource associated with HARQ feedback. Examples disclosed herein provide techniques for enabling the UE to provide the CSI feedback and the HARQ feedback while avoiding resource collisions.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by facilitating multiplexing of uplink control information. For example, the UE 104 may include a UCI multiplexing component 198 configured to receive scheduling to provide multiple A-CSI reports while foregoing A-CSI multiplexing, the scheduling for up to two A-CSI reports in a same slot for the UE, and the multiple A-CSI reports being non-overlapping in time in the same slot. Additionally, the example UCI multiplexing component 198 may be configured to transmit the multiple A-CSI reports to a base station in respective PUCCH in the same slot and while foregoing CSI multiplexing.

In another aspect of the disclosure, the example UCI multiplexing component 198 may be configured to receive a downlink grant scheduling the UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. Additionally, the example UCI multiplexing component 198 may be configured to transmit a CSI report to a base station in a PUCCH based on the downlink grant.

Still referring to FIG. 1, the base station 180 may include a UCI management component 199 configured to schedule a UE to provide multiple A-CSI reports while foregoing A-CSI multiplexing. The example UCI management component 199 may also be configured to schedule up to two A-CSI reports in a same slot for the UE, the multiple A-CSI reports being non-overlapping in time in the same slot. Additionally, the example UCI management component 199 may be configured to receive from the UE, the multiple A-CSI reports in respective PUCCH.

In another aspect of the disclosure, the example UCI management component 199 may be configured to transmit a downlink grant scheduling a UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. Additionally, the example UCI management component 199 may be configured to receive a CSI report from the UE in a PUCCH based on the downlink grant.

Although the following description provides examples directed to 5G NR (and, in particular, to multiplexing of aperiodic CSI feedback), the concepts described herein may be applicable to other similar areas, such as LTE, LTE-A, CDMA, GSM, and/or other wireless technologies, in which a UE may multiplex uplink control information to, for example, avoid occurrences of resource collisions.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
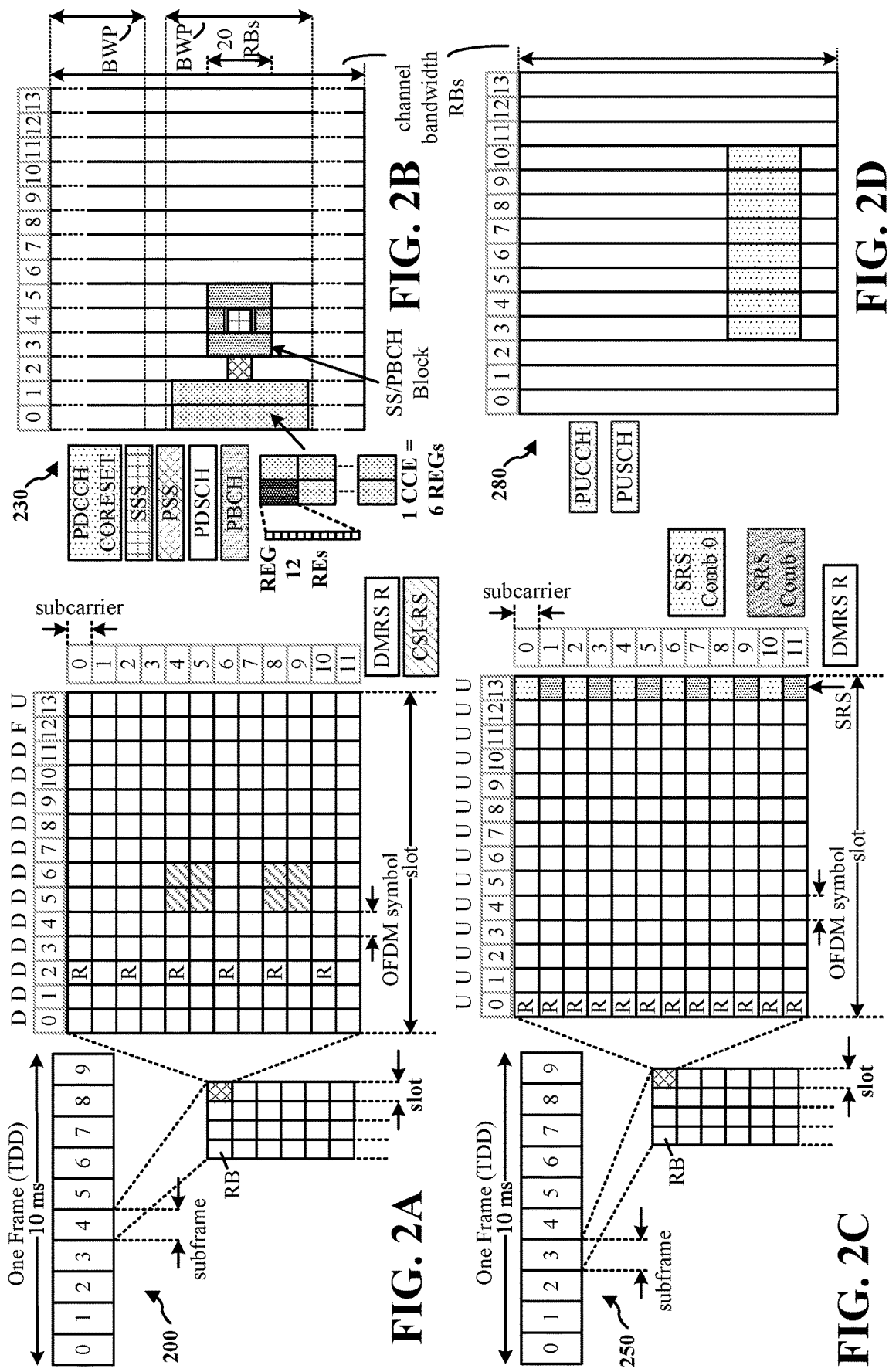
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
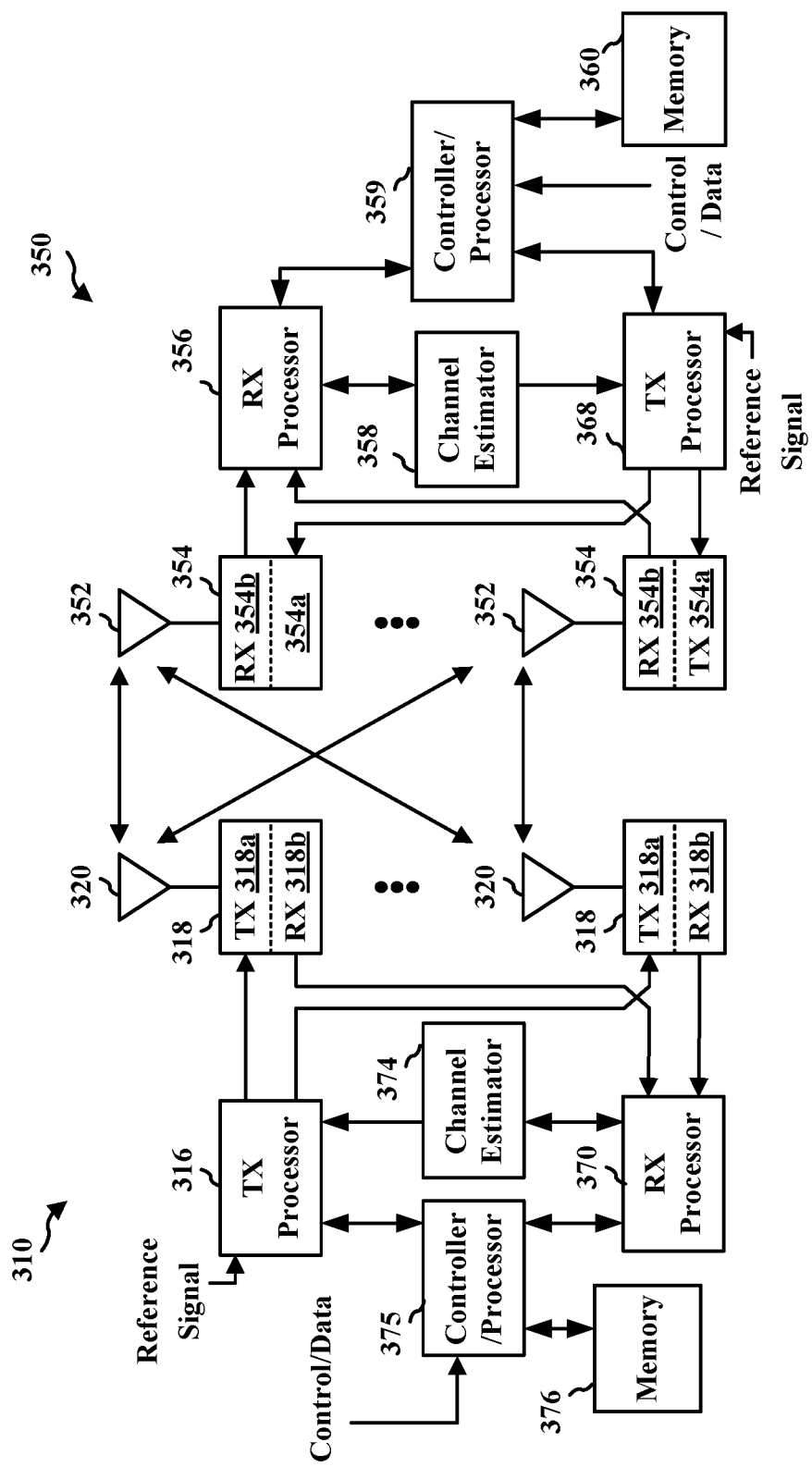
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may comprise a base station 310, the second wireless device may comprise a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI multiplexing component 198 of FIG. 1.

At least one of the TX processor 316, the RX processor 370, and the controller/processor 375 may be configured to perform aspects in connection with the UCI management component 199 of FIG. 1.

In some examples, a base station may request CSI feedback from a UE. The CSI feedback may include periodic CSI reports, semi-persistent CSI reports, and/or aperiodic CSI reports. In some examples, aperiodic CSI (A-CSI) reports may be triggered using an uplink grant and may be transmitted using an uplink data channel (e.g., a PUSCH). However, such A-CSI reports may contain old information due to, for example, the frequency at which uplink grants are provided.

Example techniques disclosed herein enable a UE to provide downlink grant-triggered A-CSI feedback on an uplink control channel (e.g., a PUCCH). Using PUCCH to provide A-CSI feedback may be faster than A-CSI reporting on PUSCH and may provide the base station with more up-to-date CSI information. Using PUCCH to provide A-CSI feedback may also reduce latency and increase reliability.

In some examples, a downlink grant may trigger CSI feedback and HARQ feedback. For example, a downlink grant may schedule a PDSCH, which may trigger the UE to provide HARQ feedback. The downlink grant may also schedule a CSI-RS that triggers the UE to provide aperiodic CSI feedback.

Figure 4:
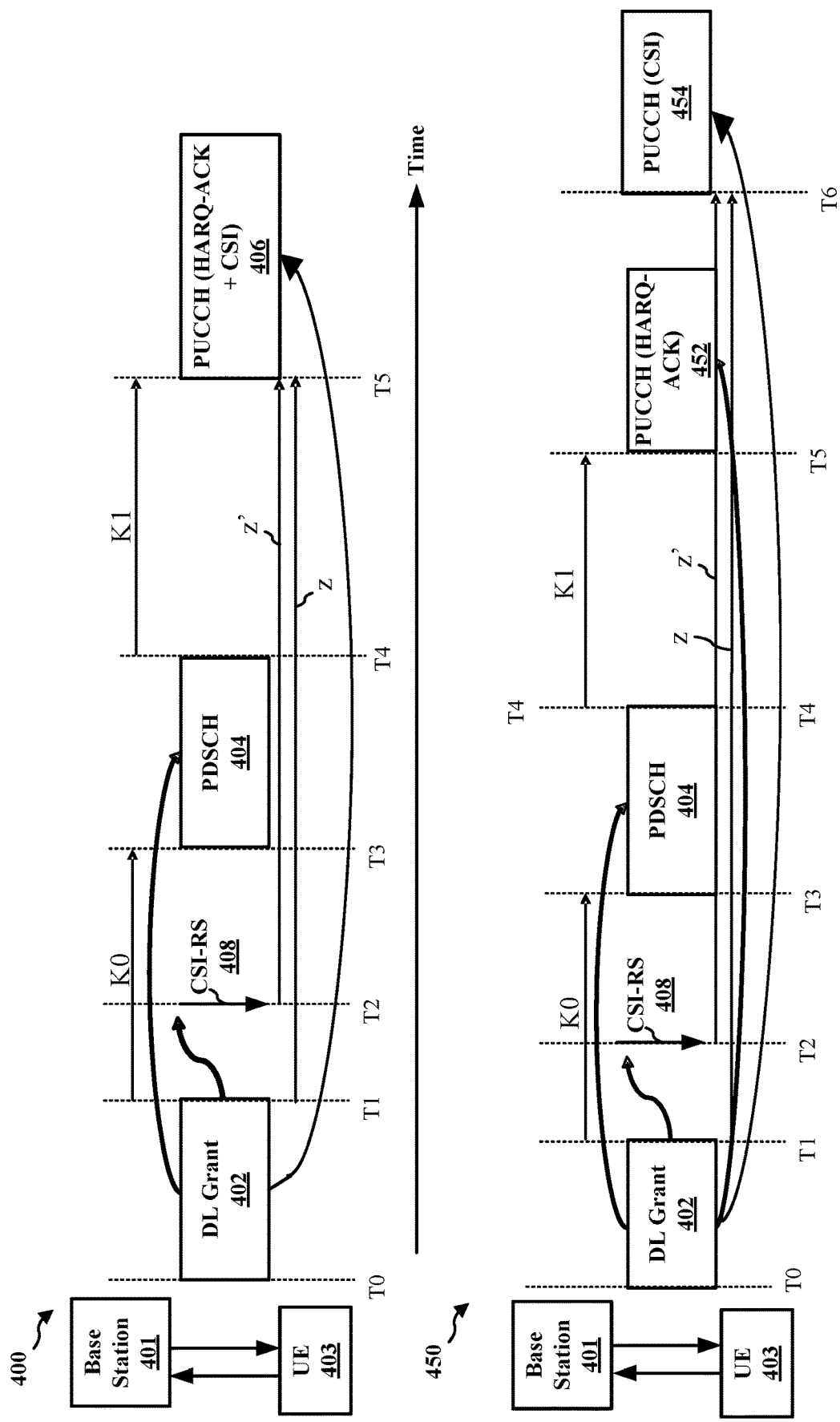
FIG. 4 is a diagram illustrating example timelines of downlink grant-triggered aperiodic CSI feedback, in accordance with various aspects of the present disclosure.

FIG. 4 is a diagram illustrating example timelines 400, 450 of downlink grant-triggered aperiodic CSI feedback, in accordance with various aspects of the present disclosure. In the illustrated example, the example timelines 400, 450 depict communications between a base station 401 (e.g., the base station 102/180 and/or the base station 310) and a UE 403 (e.g., the UE 104 and/or the UE 350).

In the example timelines 400, 450, the base station 401 may transmit a downlink grant 402 to the UE 403 at a time T0. The downlink grant 402 may schedule a PDSCH 404 at time T3 and may also trigger HARQ feedback from the UE 403 at time T5. The downlink grant 402 may also trigger a CSI-RS 408 that is received by the UE 403 at a time T2. The UE 403 may perform measurements based on the CSI-RS 408 and generate CSI feedback (e.g., a CSI report) to provide to the base station 401.

In some examples, the base station 401 may instruct the UE 403 to use a same PUCCH resource to transmit the HARQ feedback and the CSI feedback. For example, in the first example timeline 400, the downlink grant 402 may schedule the UE 403 to use a PUCCH resource 406 at time T5 to transmit the HARQ feedback and the CSI feedback that are associated with the downlink grant 402.

In some examples, the base station 401 may instruct the UE 403 to use different PUCCH resources to transmit the HARQ feedback and the CSI feedback. For example, in the second example timeline 450, the downlink grant 402 may schedule the UE 403 to use a first PUCCH resource 452 to transmit the HARQ feedback at a time T5 and may schedule the UE 403 to use a second PUCCH resource 454 to transmit the CSI feedback at a time T6.

As shown in FIG. 4, an offset (or time gap) between the downlink grant 402 (at time T1) and the PDSCH 404 (at time T3) may be referred to as a K0 offset. An offset (or time gap) between the PDSCH 404 (at time T3) and the PUCCH resource containing the HARQ feedback (at time T5) may be referred to as a K1 offset. An offset (or time gap) between the downlink grant 402 (at time T1) and the PUCCH resource containing the CSI feedback (at time T5 in the first example timeline 400 and at time T6 in the second example timeline 450) may be referred to as a z offset. An offset (or time gap) between the CSI-RS 408 (at time T2) and the PUCCH resource containing the CSI feedback may be referred to as a z' offset.

Although the second example timeline 450 depicts the first PUCCH resource 452 containing the HARQ feedback occurring before the second PUCCH resource 454 containing the CSI feedback in the time domain, in other examples, the second PUCCH resource 454 containing the CSI feedback may occur earlier than the first PUCCH resource 452 containing the HARQ feedback in the time domain.

In some examples, the UE 403 may receive two or more downlink grants that each trigger respective aperiodic CSI feedback. In some examples, the multiple feedback may be scheduled for a same slot. However, the UE 403 may be capable of transmitting one PUCCH or two PUCCH within a same slot. Additionally, the UE 403 may be configured to avoid transmitting two transmissions that overlap in time. When two resources occupy the same symbols within a slot, the two resources are said to collide.

In some examples, the base station 401 may indicate PUCCH resources for aperiodic feedback using DCI. For example, the base station 401 may transmit each downlink grant using different DCI. In some such examples, the DCI may indicate to the UE 403 the slot to use for transmitting the corresponding aperiodic CSI feedback. For example, the base station 401 may provide the z offset and/or the z' offset corresponding to the PUCCH resource containing the CSI feedback. When multiple aperiodic CSI reports are scheduled for the same slot (or sub-slot), the UE 403 may multiplex the respective CSI reports in to a same PUCCH resource. After performing the multiplexing, the UE 403 may determine which PUCCH resource to use to transmit the (multiplexed) aperiodic CSI reports. In some examples, the UE 403 may use the last PDCCH (e.g., the last DCI) to determine the PUCCH resource for transmitting the (multiplexed) aperiodic CSI reports. In some examples, the order of the PDCCH may be defined by the frequency domain and the time domain.

Figure 5:
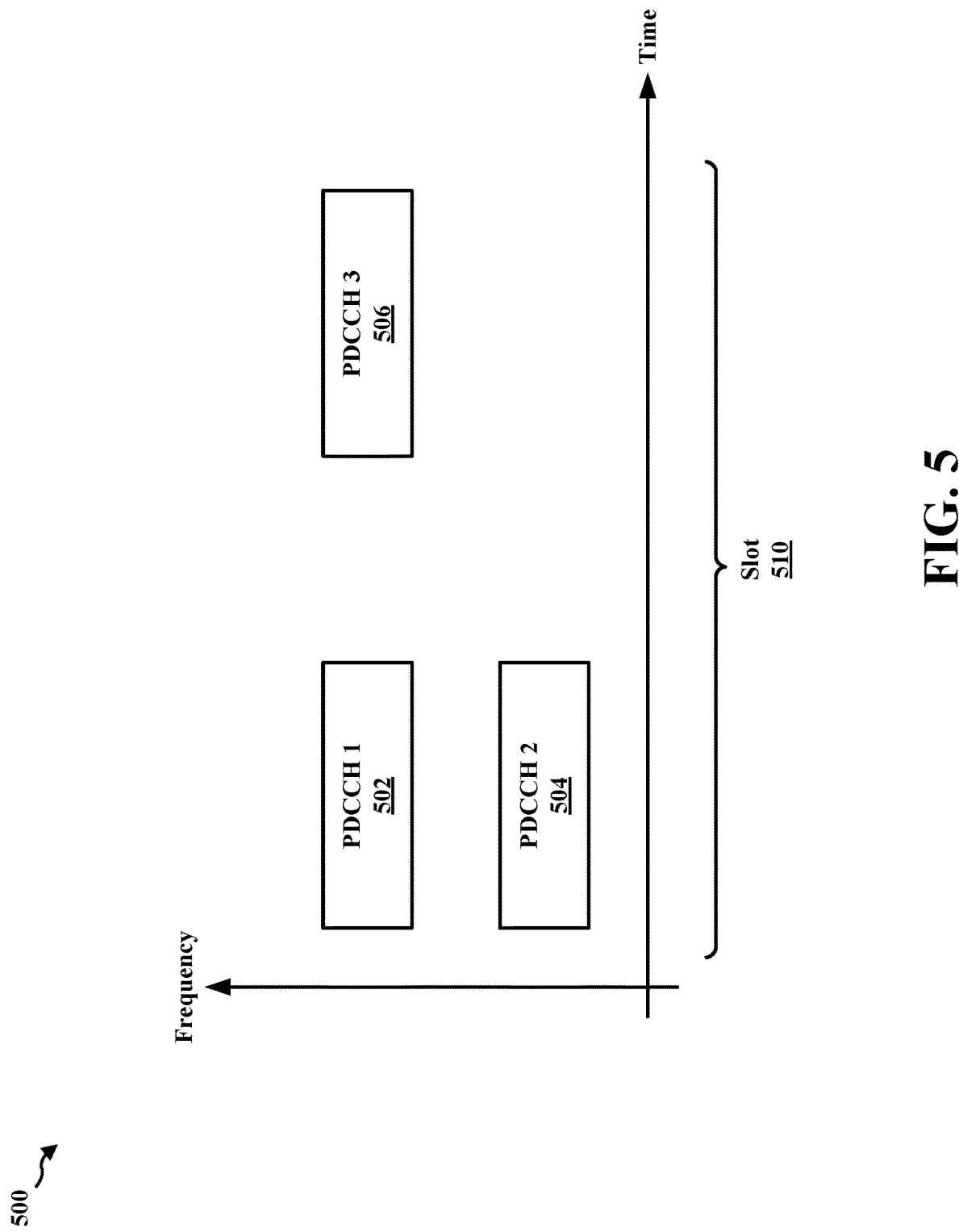
FIG. 5 depicts an example timeline including a time domain and a frequency domain, in accordance with various aspects of the present disclosure.

FIG. 5 depicts an example timeline 500 of a slot 510 including a time domain and a frequency domain. The order of PDCCH resources may be defined based on the time domain or the frequency domain. For example, in some examples, PDCCH resources may overlap in the time domain. In the illustrated example, the timeline 500 includes a first PDCCH resource 502 and a second PDCCH resource 504 that overlap in time. In some such examples, a UE may determine the PDCCH resource with the largest cell index to be the last PDCCH.

In some examples, the PDCCH resources may overlap in the frequency domain. For example, the first PDCCH resource 502 and a third PDCCH resource 506 overlap in the frequency domain. In some such examples, the UE may determine the PDCCH resource occurring later in time (e.g., the third PDCCH resource 506) to be the last PDCCH. The UE may then transmit the aperiodic CSI feedback after the identified last PDCCH.

As described, in some examples, the UE may determine to multiplex two or more aperiodic CSI reports into a single PUCCH resource. However, when multiplexing two or more aperiodic CSI reports, it may beneficial to keep track of the order of the aperiodic CSI reports. In some such examples, the base station may utilize a downlink assignment indication (DAI) to keep track of the order of the aperiodic CSI reports. The DAI may comprise two indicators including a counter DAI and a total DAI. The total DAI may indicate the total number of aperiodic CSI reports that are scheduled for a slot and the counter DAI may indicate the order number (or index) of the particular aperiodic CSI report. For example, a downlink grant containing a DAI value of (2,3) may indicate that there are three total aperiodic CSI reports scheduled for a slot and the corresponding aperiodic CSI report is the second aperiodic CSI of the three aperiodic CSI reports. In some examples, the counter DAI may indicate an index of the A-CSI report in an A-CSI codebook for multiplexing multiplex A-CSI reports, and the total DAI may indicate a total number of A-CSI reports to multiplex in a PUCCH resource.

In some examples, the DAI may enable the base station to keep track of the number of aperiodic CSI reports across different component carriers. In some such examples, the payload size for each aperiodic CSI report may be fixed across component carriers. For example, an aperiodic CSI report may be fixed to 4-bits for CQI information. In some examples, generating the multiplexed CSI reports may be based on a pseudo code, such as the pseudo code for HARQ-ACK codebook determination.

However, utilizing DAI to keep track of aperiodic CSI reports may result in increased signaling overhead. For example, the DCI may include additional bits to indicate separate PUCCH resources for aperiodic CSI reports. For example, an aperiodic CSI request may comprise one to five bits, a PUCCH resource indicator (PRI) may comprise three bits, the DAI may comprise four bits (e.g., two bits for the counter DAI and two bits for the total DAI), and any additional bits (e.g., X bits) to indicate the offset from the CSI-RS to the PUCCH resource containing the aperiodic CSI feedback (e.g., the z offset and/or the z' offset).

FIG. 6A illustrates an example flow 600 of a UE 632 receiving multiple downlink grants while employing carrier aggregation, as presented herein. When employing carrier aggregation, the UE 632 may receive multiple downlink grants (in a same slot or in a same monitoring occasion) on multiple component carriers, and each downlink grant may trigger a corresponding aperiodic CSI report. In the illustrated example, the UE 632 receives three downlink grants 602, 604, 606, which triggers three CSI-RS 603, 605, 607, respectively. The three CSI-RS 603, 605, 607 trigger three respective aperiodic CSI reports, which the UE 632 multiplexes into one PUCCH resource 608 during a slot 610. In the illustrated example, each of the downlink grants 602, 604, 606 comprises a DAI including a counter DAI and a total DAI.

In particular, at time T1, a base station 630 provides a first downlink grant 602, which triggers a first CSI-RS 603 and a corresponding aperiodic CSI report for the UE 632 to transmit to the base station 630. In the illustrated example, a DCI 620 associated with the first downlink grant 602 may comprise an offset field 622 that provides an offset (e.g., the z offset and/or the z' offset) scheduling the transmitting of the corresponding aperiodic CSI report during the slot 610. The DCI 620 may also include a DAI (1,1) indicating that at the time T1, there is one aperiodic CSI report scheduled during the slot 610 and that the aperiodic CSI report generated in response to the first CSI-RS 603 is the one aperiodic CSI report. For example, the DCI 620 may include a counter DAI field 624 indicating an order number of the corresponding aperiodic CSI report and a total DAI field 626 indicating a total number of aperiodic CSI reports scheduled for the slot 610. The first downlink grant 602 may also indicate a corresponding PUCCH resource for the UE to use to transmit the corresponding aperiodic CSI report. For example, the DCI 620 may include a PRI field 628 indicating the PUCCH resource (e.g., the PUCCH resource 608) for the UE 632 to use to transmit the corresponding aperiodic CSI report.

As shown in FIG. 6A, at time T2, the base station 630 transmits a second downlink grant 604 and a third downlink grant 606. The second downlink grant 604 triggers a second CSI-RS 605 and a corresponding aperiodic CSI report for the UE 632 to transmit to the base station 630. In a similar manner, the third downlink grant 606 triggers a third CSI-RS 607 and a corresponding aperiodic CSI report for the UE 632 to transmit to the base station 630. As shown in FIG. 6A, the three respective aperiodic CSI reports are each scheduled for the same slot 610. At the time T2, the total number of aperiodic CSI reports scheduled for the slot 610 is three aperiodic CSI reports, and, thus, the base station 630 updates the total DAI value for the second downlink grant 604 and the third downlink grant 606 to three. For example, the total DAI field of the DCI associated with the second downlink grant 604 and the third downlink grant 606 may comprise the value "3." The counter DAI field of the DCI associated with the second downlink grant 604 may comprise the value "2" indicating that the corresponding aperiodic CSI report is the second of three aperiodic CSI reports scheduled for the slot 610. In a similar manner, the counter DAI field of the DCI associated with the third downlink grant 606 may comprise the value "3" indicating that the aperiodic CSI report corresponding to the third downlink grant 606 is the third of three aperiodic CSI reports scheduled for the slot 610. In some examples, the UE 632 may determine to use the PUCCH resource indicated by the PRI field of the last downlink grant (e.g., the third downlink grant 606) to transmit the multiplexed aperiodic CSI reports.

In some examples, the UE 632 may multiplex the aperiodic CSI reports for the same carrier in a same PUCCH. For example, the base station 630 may trigger multiple CSI-RS and the interference level on the different CSI-RS may be different. By providing the CSI feedback, the UE 632 may indicate the interference level within that particular CSI-RS transmission.

For example, FIG. 6B illustrates an example flow 650 of the UE 632 receiving multiple downlink grants for a same carrier 651, as presented herein. In the illustrated example of FIG. 6B, the UE 632 receives a first downlink grant 652 at a time T1 that triggers a first CSI-RS 653 and a corresponding aperiodic CSI report for the UE 632 to transmit to the base station 630 using a PUCCH resource 656. The DCI associated with the first downlink grant 652 may comprise DAI fields including a counter DAI field 660 and a total DAI field 662. As shown in FIG. 6B, at the time T1, there is one aperiodic CSI report scheduled for a slot 658. As a result, the base station 630 may set the DAI fields 660, 662 for the DCI of the first downlink grant 652 to (1,1).

In a similar manner, the UE 632 may receive a second downlink grant 654 at a time T2 that triggers a second CSI-RS 655 and a corresponding aperiodic CSI report for the UE 632 to transmit to the base station 630. The DCI associated with the second downlink grant 654 may comprise DAI fields including a counter DAI field 670 and a total DAI field 672. As shown in FIG. 6B, at the time T2, there are two aperiodic CSI reports scheduled for a slot 658. As a result, the base station 630 may set the DAI fields 670, 672 for the DCI of the second downlink grant 654 to (2,2).

Figure 7:
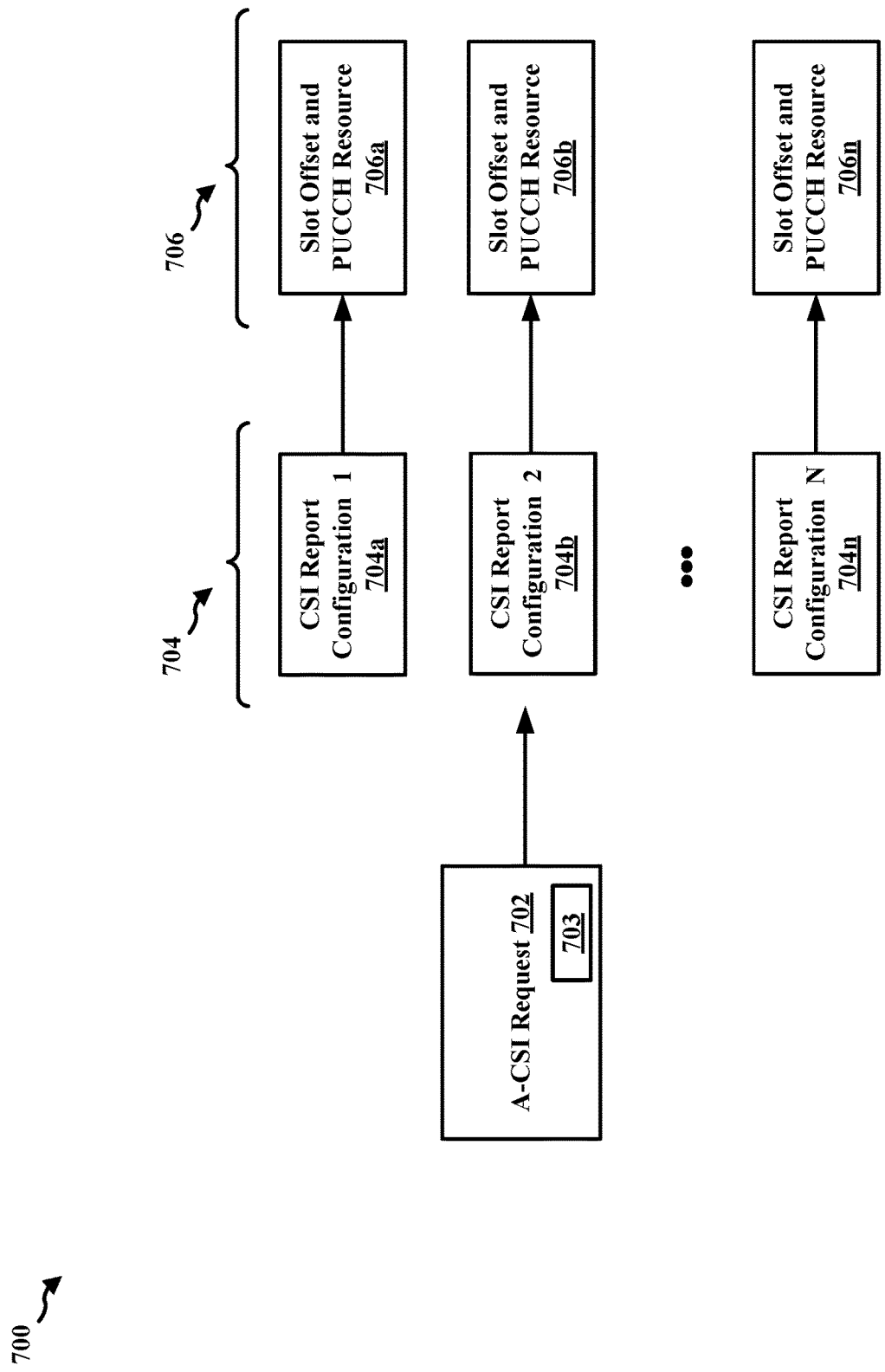
FIG. 7 illustrates an example timeline in which a PUCCH resource for an aperiodic CSI report is indicated via RRC signaling, in accordance with the teachings disclosed herein.

In some examples, a base station may indicate PUCCH resources for aperiodic feedback using RRC signaling. FIG. 7 illustrates an example timeline 700 in which a PUCCH resource for an aperiodic CSI report is indicated via RRC signaling. For example, the base station may use RRC signaling to configure a UE with a set of CSI report configurations 704 comprising one or more CSI report configurations 704a, 704b, . . . 704n. Each CSI report configuration of the set of CSI report configurations 704 may define how the UE is to calculate a respective CSI report. For example, a first CSI report configuration 704a may instruct the UE to calculate a CSI report comprising channel quality indicators, rank indicators, and precoding matrix indicators from CSI reference signal measurements, a second CSI report configuration 704b may instruct the UE to calculate a CSI report comprising "in-sync" and "out-of-sync" indicators for radio link failure detection based on the CSI reference signals, etc.

In some examples, each CSI report configuration of the set of CSI report configurations 704 may be associated with a slot offset and PUCCH resource information 706 comprising one or more slot offset and PUCCH resource configurations 706a, 706b, . . . 706n. For example, the first CSI report configuration 704a may be linked with a first slot offset and PUCCH resource configuration 706a comprising a corresponding first slot offset (e.g., the z offset and/or the z' offset) and a first PUCCH resource, the second CSI report configuration 704b may be linked with a second slot offset and PUCCH resource configuration 706b comprising a corresponding second slot offset and a second PUCCH resource, etc.

In some such examples in which the UE is configured with a set of CSI report configurations 704, the base station may indicate an aperiodic CSI request 702 that is received by the UE. The aperiodic CSI request 702 may be triggered by a downlink grant. The base station may transmit the aperiodic CSI request 702 using DCI. In some examples, the aperiodic CSI request 702 may indicate a particular CSI report configuration of the set of CSI report configurations 704. For example, in the illustrated example of FIG. 7, the aperiodic CSI request 702 may include an indicator 703 identifying the second CSI report configuration 704b. The UE may use the second CSI report configuration 704b to calculate the requested CSI report. The UE may then use the corresponding second slot offset and PUCCH resource configuration 706b to determine the slot offset and PUCCH resource to use for transmitting the corresponding CSI report.

It may be appreciated that when the base station configures the UE with a set of CSI report configurations 704, the base station may avoid separately providing the slot offset and PUCCH resource for each aperiodic CSI request because the slot offset and the PUCCH resource are associated with the CSI report configuration indicated via the aperiodic CSI request using DCI. Additionally, if the base station indicates a second aperiodic CSI request (e.g., another downlink grant triggering CSI feedback), the base station may associate the second aperiodic CSI request with a different CSI report configuration of the set of CSI report configurations 704, which is associated with corresponding slot offset and PUCCH resource information 706.

Although the illustrated example of FIG. 7 depicts the set of CSI report configurations 704 comprising a plurality of CSI report configurations 704a, 704b, . . . 704n, in other examples, the set of CSI report configurations 704 may comprise any suitable quantity of CSI report configurations, such as one CSI report configuration, two CSI report configurations, etc.

Additionally, in some examples, the respective slot offset and PUCCH resource information 706 corresponding to different CSI report configurations of the set of CSI report configurations 704 may result in multiple CSI reports being scheduled for the same slot. In some such examples, the UE may multiplex the two or more CSI reports scheduled for the same slot into a single PUCCH resource.

As described herein, in some examples, the UE may be scheduled to transmit multiple aperiodic CSI reports in a slot. However, the UE may be limited to transmitting one PUCCH resource or two PUCCH resources within a slot. Additionally, the UE may be prevented (e.g., due to hardware capabilities, etc.) from transmitting two PUCCH resources that overlap in time. In some examples, the UE may be configured with a parameter that enables CSI multiplexing. For example, the base station may provide the UE a multiplexing CSI PUCCH resource list ("multi-CSI-PUCCH-resourceList"). The multiplexing CSI PUCCH resource list may indicate one or more PUCCH resources that the UE may be configured to use for multiplexing. For a transmission occasion of multiple CSI reports, corresponding PUCCH resources can be provided by the multiplexing CSI PUCCH resource list. For example, the UE may combine multiple CSI reports in a resource from a resource set provided by the multiplexing CSI PUCCH resource list. However, in some examples, the base station may forego providing (e.g., not provide) the UE a multiplexing CSI PUCCH resource list.

Figure 8A:
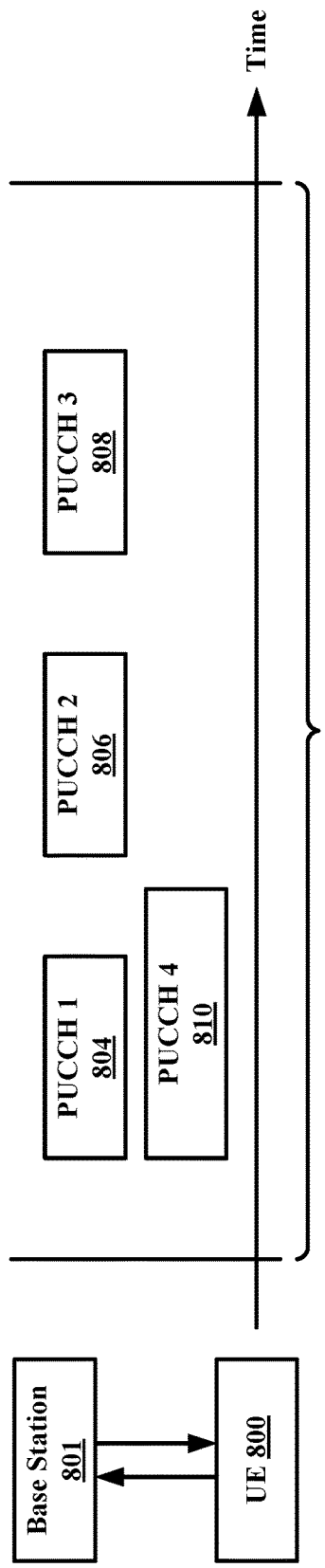
FIG. 8A depicts an example slot within which multiple PUCCH resources may be scheduled for transmission by a UE, in accordance with one or more techniques disclosed herein
Figure 8B:
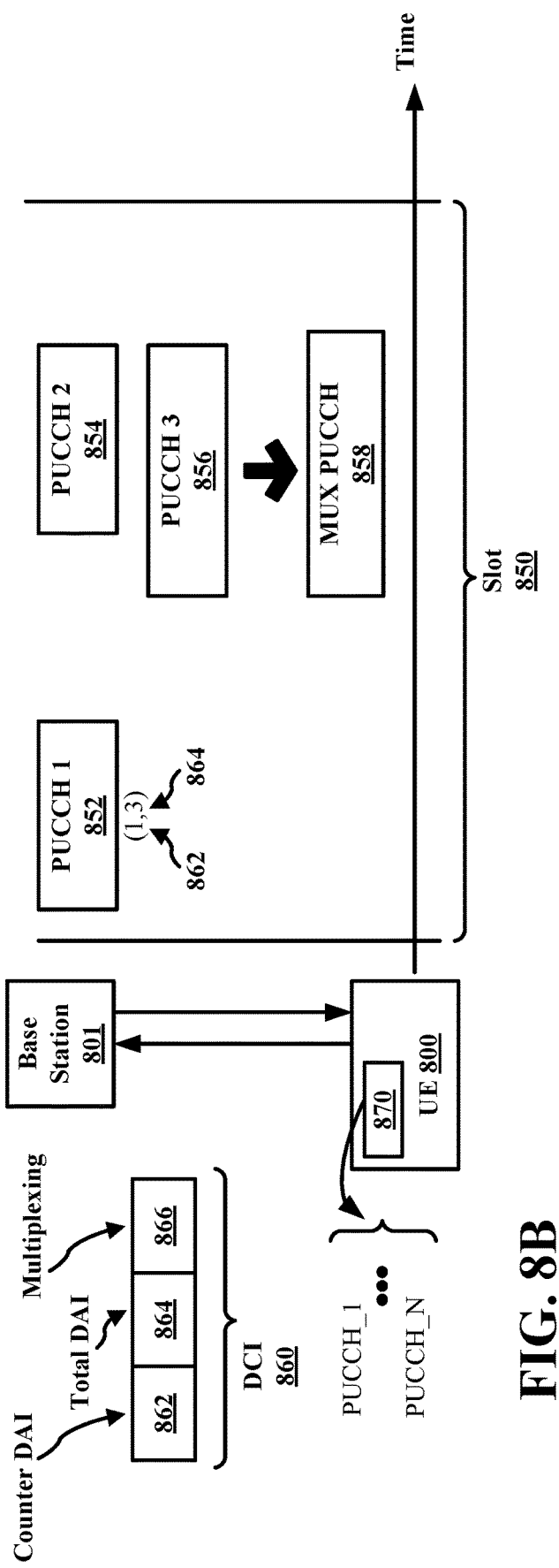
FIG. 8B depicts another example slot within which multiple PUCCH resources may be scheduled for transmission by a UE, in accordance with one or more techniques disclosed herein.

FIG. 8A and FIG. 8B depict example slots within which multiple PUCCH resources are scheduled for transmission by a UE 800, in accordance with one or more techniques disclosed herein. In the illustrated example of FIG. 8A, the UE 800 may be configured to forego CSI multiplexing. For example, the UE 800 may not be provided and/or configured with a multiplexing CSI PUCCH resource list. Additionally, or alternatively, the UE 800 may be configured so that the PUCCH resources are non-overlapping in time within a same slot. In some such examples, the UE 800 may select two non-overlapping PUCCH resources with the highest priority.

In a first example of FIG. 8A, the UE 800 may be scheduled to transmit three non-overlapping PUCCH resources in a same slot 802. For example, the UE 800 may be scheduled to transmit a first PUCCH resource 804 having a highest priority level (e.g., a priority level of one), a second PUCCH resource 806 having a second highest priority level (e.g., a priority level of two), and a third PUCCH resource 808 having a third highest priority level (e.g., a priority level of three). In the first example of FIG. 8A, the three PUCCH resources 804, 806, 808 do not overlap in time. Accordingly, the UE 800 may select two non-overlapping PUCCH resources with the highest priority for transmitting to a base station 801. For example, the UE 800 may select the first PUCCH resource 804 and the second PUCCH resource 806 for transmitting to the base station 801. The UE 800 may drop the remaining PUCCH resource(s) (e.g., the third PUCCH resource 808).

In the first example of FIG. 8A, the UE 800 may or may not be configured with a multiplexing CSI PUCCH resource list. In a second example of FIG. 8A, the UE 800 may not be configured with a multiplexing CSI PUCCH resource list, may be scheduled to transmit three PUCCH resources during the slot 802, and two of the three PUCCH resources may overlap in time. For example, the UE 800 may be scheduled to transmit the first PUCCH resource 804, the third PUCCH resource 808, and a fourth PUCCH resource 810. The fourth PUCCH resource 810 may have a lowest priority level (e.g., a priority level of four). In some such examples, the UE 800 may first select the PUCCH resource corresponding to the CSI report with the highest priority. In the second example of FIG. 8A, the PUCCH resource corresponding to the CSI report with the highest priority is the first PUCCH resource 804. The UE 800 may then select the second PUCCH resource for transmitting by identifying the one or more PUCCH resource(s) that do not overlap with the first PUCCH resource 804. The UE 800 may then select the PUCCH resource with the highest remaining priority level from the identified one or more PUCCH resource(s). For example, as shown in FIG. 8A, the first PUCCH resource 804 and the fourth PUCCH resource 810 overlap in time. Accordingly, the UE 800 may discard the fourth PUCCH resource 810 from consideration and select the PUCCH resource with the highest remaining priority level (e.g., the third PUCCH resource 808). The UE may then drop the remaining PUCCH resources (e.g., the fourth PUCCH resource 810).

In the illustrated examples of FIG. 8A, the priority levels for the PUCCH resources may be defined with respect to CSI report type (e.g., aperiodic CSI reports are higher priority than semi-persistent CSI reports, which are higher priority than periodic CSI reports), cell identifiers, and CSI report configuration identifiers.

Still referring to the examples of FIG. 8A, in some examples, it may not be reasonable to drop aperiodic CSI reports. For example, the base station 801 may schedule an aperiodic CSI report to receive up-to-date CSI information from the UE 800. However, if more than two aperiodic CSI reports are scheduled for the same slot, then the UE 800 may drop at least one of the aperiodic CSI reports as the UE 800 may be limited to transmitting one PUCCH resource or two PUCCH resources within a slot. To prevent aperiodic CSI reports from being dropped, the base station 801 may be configured to schedule no more than two aperiodic CSI reports within the same slot. Additionally, the base station 801 may be configured to schedule the one or two aperiodic CSI reports within the same slot so that the two aperiodic CSI reports do not overlap in time (e.g. are non-overlapping in time in a same slot).

For example, in the first example of FIG. 8A, the base station 801 may schedule the PUCCH resources so that no more than two of the first PUCCH resource 804, the second PUCCH resource 806, and the third PUCCH resource 808 correspond to aperiodic CSI reports. With respect to the second example of FIG. 8A, the base station 801 may schedule the PUCCH resources so that no more than two of the first PUCCH resource 804, the third PUCCH resource 808, and the fourth PUCCH resource 810 correspond to aperiodic CSI reports. Additionally, because the first PUCCH resource 804 and the fourth PUCCH resource 810 overlap in time, the base station 801 may schedule the PUCCH resources so that the first PUCCH resource 804 and the fourth PUCCH resource 810 do not both correspond to aperiodic CSI reports.

In the illustrated example of FIG. 8B, the UE 800 may be configured with a multiplexing CSI PUCCH resource list, and at least two PUCCH resources may overlap in time within the slot. In some such examples, the UE 800 may multiplex the aperiodic CSI reports into a single PUCCH resource and transmit the PUCCH resource using a resource from the multiplexing CSI PUCCH resource list. For example, the UE 800 may be scheduled to transmit a first PUCCH resource 852, a second PUCCH resource 854, and a third PUCCH resource 856 during a slot 850. In the example of FIG. 8B, the UE 800 is configured with a multiplexing CSI PUCCH resource list 870 that indicates one or more PUCCH resources (e.g., "PUCCH_1," . . . "PUCCH_N") for the UE 800 to use for multiplexing. As shown in FIG. 8B, the second PUCCH resource 854 and the third PUCCH resource 856 overlap in time. Accordingly, the UE 800 may multiplex the three PUCCH resources 852, 854, 856 scheduled for the slot 850 into a multiplexing PUCCH 858 ("MUX PUCCH"). The multiplexing PUCCH 858 may be selected from the multiplexing CSI PUCCH resource list 870. In some examples, the UE 800 may select the multiplexing PUCCH 858 based on a payload size of the multiplexed aperiodic CSI reports. For example, if the payload load of the multiplexed aperiodic CSI reports is within a first range (e.g., 10 to 20 bits), then the UE 800 may select a first multiplexing PUCCH resource, if the payload size of the multiplexed aperiodic CSI reports is within a second range (e.g., 21 to 30 bits), then the UE 800 may select a second multiplexing PUCCH resource, etc.

As described herein, when multiplexing two or more aperiodic CSI reports, it may beneficial to keep track of the order of the aperiodic CSI reports. In some such examples, the base station 801 may utilize DAI to keep track of the order of the aperiodic CSI reports. For example, the base station 801 may transmit a counter DAI and a total DAI using the DCI associated with the respective downlink grants triggering the respective aperiodic CSI reports and scheduling the respective aperiodic CSI reports within the slot 850.

Additionally, the base station 801 may provide an indication indicating a multiplexing behavior for the PUCCH resources scheduled within the slot 850. For example, the base station 801 may indicate whether aperiodic CSI multiplexing is scheduled or not scheduled. The base station 801 may provide the multiplexing behavior indication to prevent miscommunications between the base station 801 and the UE 800. For example, due to an error in transmission, the UE 800 may miss one CSI-RS and, thus, may not calculate an aperiodic CSI report corresponding to one of the PUCCH resources 852, 854, 856 of slot 850. For example, the UE 800 may miss the CSI-RS associated with the second PUCCH resource 854. In some such examples, The UE 800 may determine that there are two PUCCH resources scheduled within the slot 850 (e.g., the first PUCCH resource 852 and the third PUCCH resource 856), and as the two PUCCH resources 852, 856 are non-overlapping in time within the slot 850, the UE 800 may transmit the two respective aperiodic CSI reports without multiplexing. However, the base station 801 may be expecting a multiplexed CSI report (e.g., the multiplexing PUCCH 858) as the base station 801 scheduled three aperiodic CSI reports for the slot 850. Thus, to avoid such scenarios, the base station 801 may provide a multiplexing behavior indication indicating whether the UE 800 is to perform aperiodic CSI multiplexing for the slot.

In some examples, the base station 801 may provide the multiplexing behavior indication in a multiplexing field of DCI. For example, a DCI 860 may correspond to a downlink grant that triggers an aperiodic CSI report associated with the first PUCCH resource 852. The DCI 860 may include at least one of a counter DAI field 862 indicating an order number of the corresponding aperiodic CSI report and a total DAI field 864 indicating a total number of aperiodic CSI reports scheduled for the slot 850. For example, the DAI fields 862, 864 of the DCI 860 of the downlink grant corresponding to the first PUCCH resource 852 may be set to (1,3) indicating that the aperiodic CSI report corresponding to the first PUCCH resource 852 is the first of three aperiodic CSI reports scheduled for the slot 850. The DCI 860 may also include a multiplexing field 866 that indicates a multiplexing behavior for the slot 850. For example, the base station 801 may set the multiplexing field 866 to a first value (e.g., a "0") to indicate no multiplexing, and may set the multiplexing field 866 to a second value (e.g. a "1") to indicate multiplexing. However, adding the multiplexing field 866 to the DCI 860 incurs a one-bit overhead.

In some examples, the base station 801 may use DAI fields of the DCI to provide the multiplexing behavior indications. For example, the base station 801 may set the total DAI field 864 of the DCI 860 to a "00" value to indicate no multiplexing. Thus, if the value of the total DAI field 864 is set to a value different than "00," the UE 800 may determine to perform multiplexing.

However, in some examples, the "00" value for the total DAI field 864 may indicate to the UE 800 to perform multiplexing of 4, 8, etc. aperiodic CSI reports. For example, while the total DAI field 864 may be two-bits, the total number of aperiodic CSI reports scheduled for a slot may be more than four. In some such examples, the UE 800 may use the counter DAI field 862 to determine whether the "00" value for the total DAI field 864 corresponds to no multiplexing or to multiplexing of 4, 8, etc. aperiodic CSI reports. For example, when then total DAI field 864 is set to "00" and the counter DAI field 862 is set to "01," then the UE 800 may determine that the "00" value of the total DAI field 864 corresponds to no multiplexing. Otherwise, if the total DAI field 864 is set to "00" and the counter DAI field 862 is set to a value different than "01," then the UE 800 may determine that the "00" value of the total DAI field 864 corresponds to multiplexing 4, 8, etc. aperiodic CSI reports.

Figure 9:
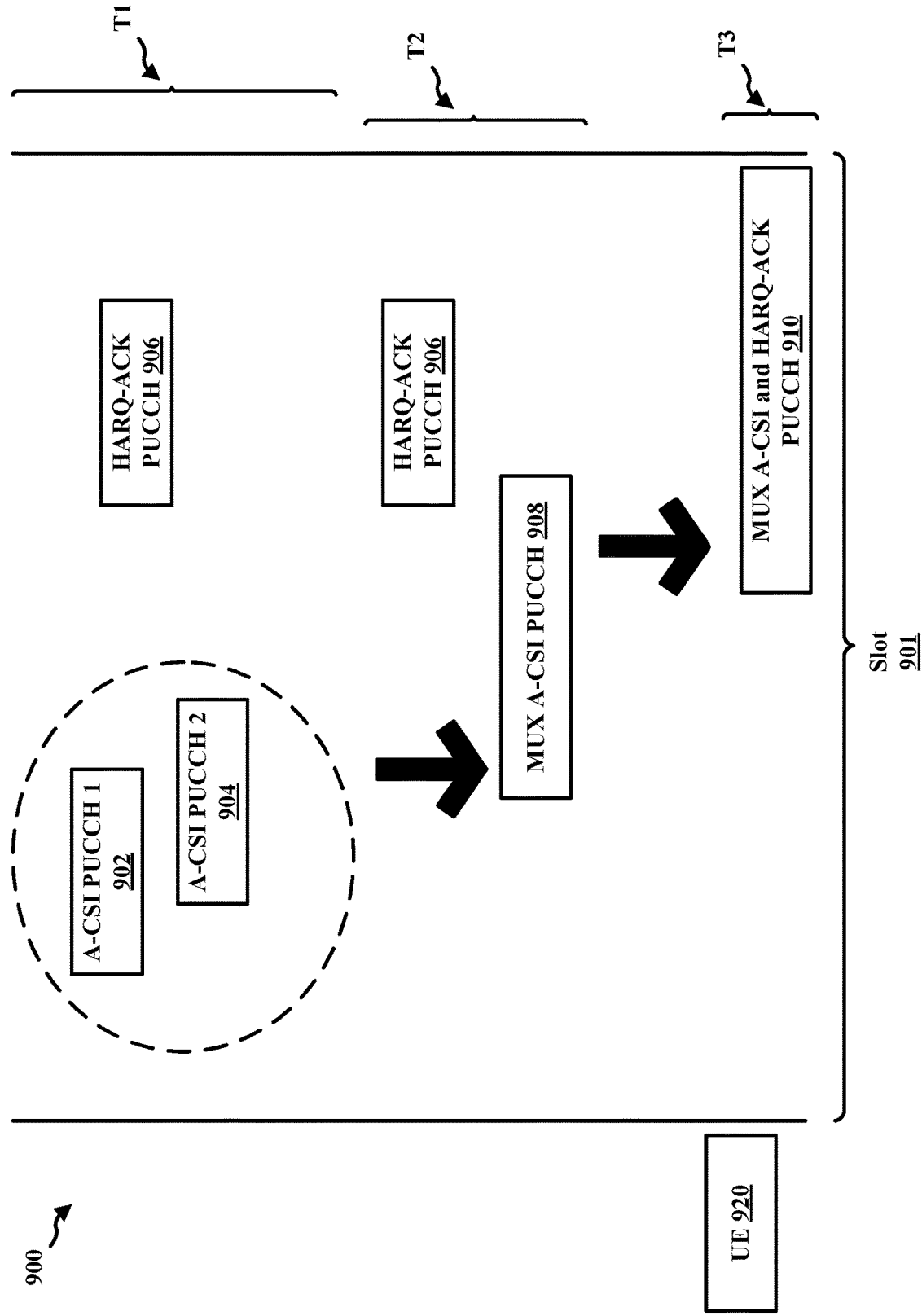
FIG. 9 illustrates a sequence of multiplexing of PUCCH resources within a slot, in accordance with the teachings disclosed herein.

As mentioned in connection with FIG. 4, in some examples, a downlink grant may trigger aperiodic CSI feedback and HARQ feedback in separate PUCCH resources (e.g., as shown in the second example timeline 450). FIG. 9 illustrates a sequence 900 of multiplexing of PUCCH resources within a slot, in accordance with the teachings disclosed herein. At a time T1, a UE 920 may determine that there are multiple PUCCH resources scheduled for transmitting during a slot 901. For example, the UE 920 may determine that there is a first A-CSI PUCCH resource 902, a second A-CSI PUCCH resource 904, and a HARQ-ACK PUCCH resource 906 scheduled for transmitting during the slot 901. Using the techniques disclosed herein, the UE 920 may determine to multiplex the A-CSI PUCCH resources 902, 904 into a single multiplexing A-CSI PUCCH resource 908 ("MUX A-CSI PUUCH"). As shown in FIG. 9, at time T2, the slot 901 may contain the multiplexing A-CSI PUCCH resource 908 and the HARQ-ACK PUCCH resource 906. In some examples, the UE 920 may have the capability to transmit the HARQ-ACK PUCCH resource 906 and the multiplexing A-CSI PUCCH resource 908. For example, the UE 920 may have the capability to transmit the PUCCH resources 906, 908 when the PUCCH resources 906, 908 are non-overlapping in the time domain. However, if the UE 920 determines that the PUCCH resources 906, 908 are overlapping in time, then the UE 920 may determine to multiplex the PUCCH resources 906, 908 into a single multiplexing A-CSI and HARQ-ACK PUCCH resource 910. As shown in FIG. 9, at time T3, the slot 901 may contain the multiplexing A-CSI and HARQ-ACK PUCCH resource 910. The UE 920 may then transmit the single PUCCH resource containing the HARQ feedback and the aperiodic CSI feedback (e.g., the multiplexing A-CSI and HARQ-ACK PUCCH resource 910).

Although the example of FIG. 9 includes a single HARQ-ACK PUCCH resource 906, other examples may include any suitable quantity of HARQ-ACK PUCCH resources, such as two resources or three resources. Thus, it may be appreciated that the HARQ-ACK PUCCH resource 906 may correspond to a single HARQ-ACK PUCCH resource scheduled for the slot 901, or may correspond to a multiplexed HARQ-ACK PUCCH resource based on a plurality of HARQ-ACK PUCCH resources scheduled for transmitting during the slot 901.

Figure 10:
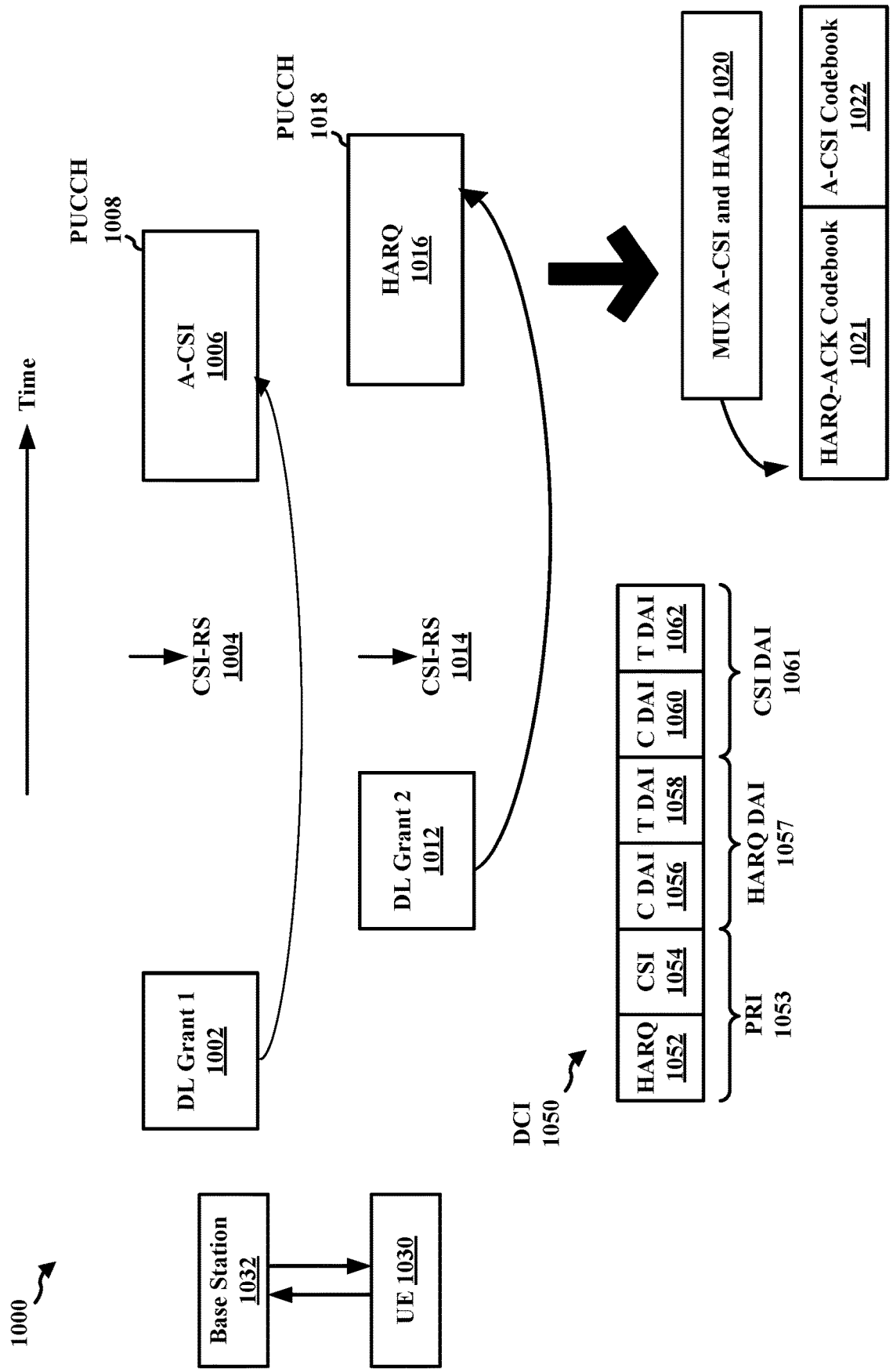
FIG. 10 illustrates a diagram comprising multiple downlink grants triggering separate PUCCH resources for transmitting aperiodic CSI feedback and HARQ feedback, in accordance with the teachings disclosed herein.

FIG. 10 illustrates a diagram 1000 comprising multiple downlink grants triggering separate PUCCH resources for transmitting aperiodic CSI feedback and HARQ feedback, in accordance with the teachings disclosed herein. For example, FIG. 10 includes a first downlink grant 1002 that triggers a first CSI-RS 1004, which causes a UE 1030 to calculate a CSI report and to provide aperiodic CSI feedback 1006. Using the techniques disclosed herein, the UE 1030 may determine to use a first PUCCH resource 1008 for transmitting the aperiodic CSI feedback 1006. It may be appreciated that the aperiodic CSI feedback 1006 may correspond to a single CSI report or may correspond to a multiplexed CSI report, such as a multiplexed CSI report corresponding to the multiplexing A-CSI PUCCH resource 908 of FIG. 9.

FIG. 10 also includes a second downlink grant 1012 that triggers a second CSI-RS 1014, and also triggers the UE 1030 to provide HARQ feedback 1016. As shown in FIG. 10, the UE 1030 may determine to use a second PUCCH resource 1018 to transmit the HARQ feedback 1016. It may be appreciated that the HARQ feedback 1016 may correspond to a single HARQ feedback or may correspond to a multiplexed HARQ feedback.

As shown in FIG. 10, the two PUCCH resources 1008, 1018 overlap, at least partially, in time. As a result, the UE 1030 may determine to multiplex the aperiodic CSI feedback 1006 and the HARQ feedback 1016 into a multiplexed aperiodic CSI and HARQ feedback 1020. The UE 1030 may then determine which PUCCH resource to use for transmitting the multiplexed aperiodic CSI and HARQ feedback 1020.

In the example of FIG. 10, each downlink grant 1002, 1012 may be associated with a respective DCI 1050 containing multiple fields. For example, the DCI 1050 of FIG. 10 includes two PRI fields 1053 (e.g., a HARQ PRI field 1052 and a CSI PRI field 1054), two HARQ DAI fields 1057 (e.g., a HARQ counter DAI field 1056 ("C DAI") and a HARQ total DAI field 1058 ("T DAI")), and two CSI DAI fields 1061 (e.g. a CSI counter DAI field 1060 ("C DAI") and a CSI total DAI field 1062 ("T DAI")). The two PRI fields 1052, 1054 may instruct the UE 1030 to use a specific PUCCH resource when returning respective feedback. For example, when the UE 1030 is transmitting HARQ feedback, the UE 1030 may use the PUCCH resource indicated by the HARQ PRI field 1052 for transmitting the HARQ feedback, and when the UE 1030 is transmitting aperiodic CSI feedback, the UE 1030 may use the PUCCH resource indicated by the CSI PRI field 1054 for transmitting the aperiodic CSI feedback.

In the illustrated example of FIG. 10, a base station 1032 may indicate the PUCCH resources for feedback using DCI. As described in connection with FIGS. 5, 6A, and 6B, when the PUCCH resources for feedback are indicated using DCI, the UE 1030 may use the last PDCCH to determine the PUCCH resource to use for transmitting the multiplexed aperiodic CSI and HARQ feedback 1020. For example, the UE 1030 may first determine the last PDCCH based on an occurrence in the time-domain. In the illustrated example of FIG. 10, the UE 1030 may determine that the second downlink grant 1012 is the last PDCCH. The UE 1030 may then determine what kind of feedback is scheduled by the last PDCCH. For example, the UE 1030 may determine that the second downlink grant 1012 schedules the HARQ feedback 1016. The UE 1030 may then use the PRI for the determined feedback provided by the last PDCCH. For example, the UE 1030 may determine to use the PUCCH resource indicated by the HARQ PRI field 1052 of the DCI 1050 corresponding to the second downlink grant 1012. For example, the UE 1030 may determine to use the second PUCCH resource 1018 to transmit the multiplexed aperiodic CSI and HARQ feedback 1020.

As shown in FIG. 10, the DCI 1050 includes the HARQ DAI fields 1057 and the CSI DAI fields 1061 to facilitate the UE 1030 multiplexing HARQ feedback and CSI feedback. In some examples, the UE 1030 may determine a HARQ-ACK codebook 1021 and an aperiodic CSI codebook 1022 separately, and then concatenate the two respective codebooks 1021, 1022 when transmitting the multiplexed aperiodic CSI and HARQ feedback 1020. For example, the UE 1030 may use the value of the HARQ counter DAI field 1056 and the value of the HARQ total DAI field 1058 to determine the size of the HARQ-ACK codebook 1021. The UE 1030 may also use the value of the CSI counter DAI field 1060 and the value of the CSI total DAI field 1062 to determine the size of the aperiodic CSI codebook 1022. In some examples, the UE 1030 may then select a PUCCH resource based on the size of the concatenated codebooks 1021, 1022.

Figure 11:
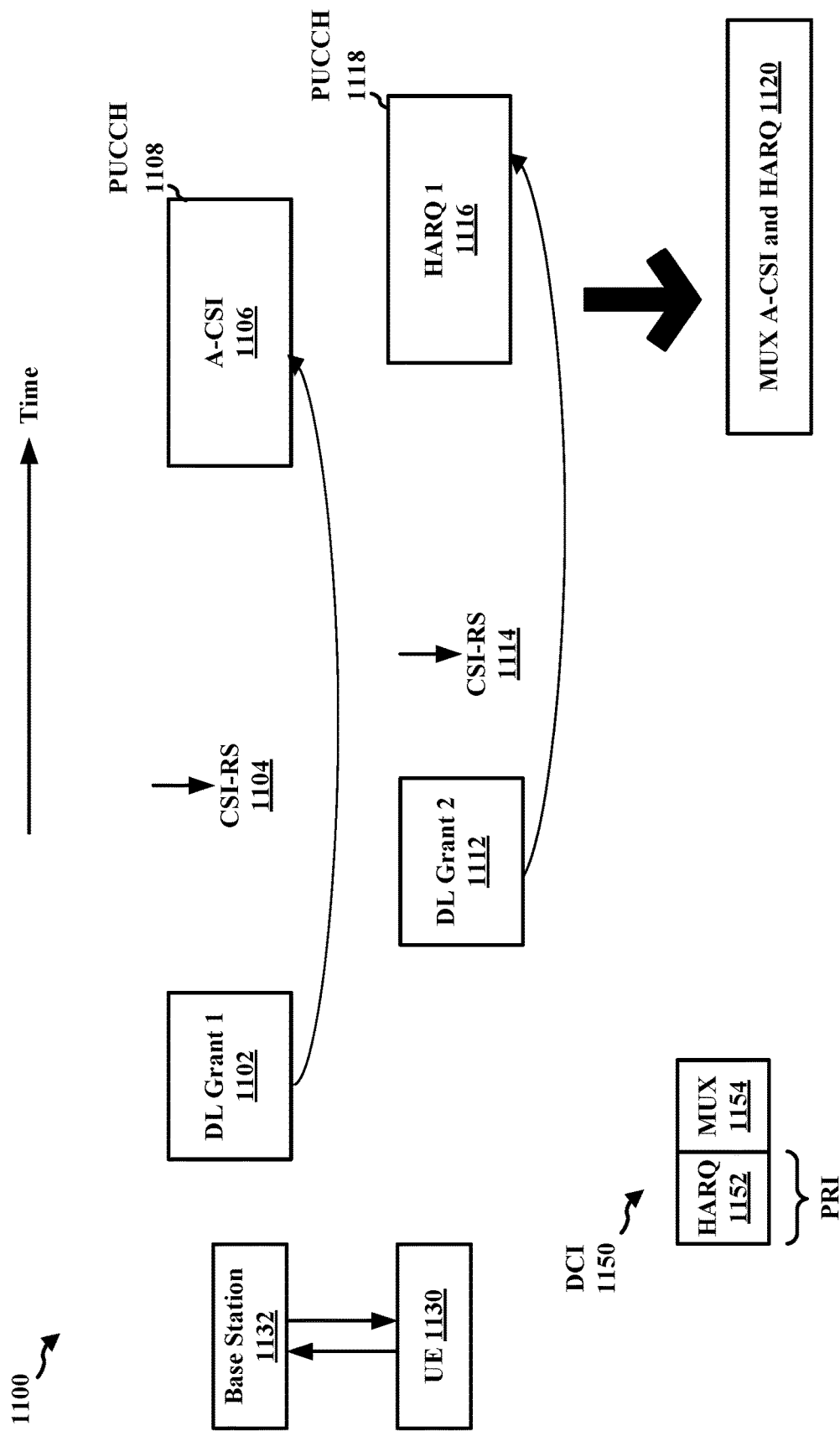
FIG. 11 illustrates a diagram comprising multiple downlink grants triggering separate PUCCH resources for transmitting aperiodic CSI feedback and HARQ feedback, in accordance with the teachings disclosed herein.

FIG. 11 illustrates a diagram 1100 comprising multiple downlink grants triggering separate PUCCH resources for transmitting aperiodic CSI feedback and HARQ feedback, in accordance with the teachings disclosed herein. In the illustrated example of FIG. 11, the PUCCH resources indicated for transmitting aperiodic CSI feedback are indicated by a base station 1132 using RRC signaling, as described in connection with FIG. 7. For example, the base station 1132 may configure a UE 1130 with a set of CSI report configurations 704 and where each CSI report configuration is linked with a corresponding slot offset and PUCCH resource. The downlink grant requesting aperiodic CSI feedback may then identify a CSI report configuration, which the UE 1130 may use to identify the corresponding slot offset and PUCCH resource for transmitting the respective aperiodic CSI feedback.

In the illustrated example of FIG. 11, a first downlink grant 1102 may trigger a first CSI-RS 1104, which causes the UE 1130 to calculate a CSI report and to provide aperiodic CSI feedback 1106. Using the techniques disclosed herein, the UE 1130 may determine to use a first PUCCH resource 1108 for transmitting the aperiodic CSI feedback 1106. It may be appreciated that the aperiodic CSI feedback 1106 may correspond to a single CSI report or may correspond to a multiplexed CSI report, such as a multiplexed CSI report corresponding to the multiplexing A-CSI PUCCH resource 908 of FIG. 9.

FIG. 11 also includes a second downlink grant 1112 that triggers a second CSI-RS 1114, and also triggers the UE 1130 to provide HARQ feedback 1116. As shown in FIG. 11, the UE 1130 may determine to use a second PUCCH resource 1118 to transmit the HARQ feedback 1116.

Similar to the example of FIG. 10, in the illustrated example of FIG. 11, the UE 1130 may determine that the two PUCCH resources 1108, 1118 overlap, at least partially, in the time-domain and, thus, may determine to multiplex the aperiodic CSI feedback 1106 and the HARQ feedback 1116 into a single multiplexed aperiodic CSI and HARQ feedback 1120. The UE 1130 may then determine which PUCCH resource to use to transmit the multiplexed aperiodic CSI and HARQ feedback 1120.

In the example of FIG. 11, as the PUCCH resources for the aperiodic CSI feedback is RRC configured (e.g., via the set of CSI report configurations), DCI 1150 associated with the downlink grants may comprise one PRI indicated by a HARQ PRI field 1152. As a result, there is just one PUCCH resource that the base station 1132 can use to indicate to transmit the multiplexed aperiodic CSI and HARQ feedback 1120. That is, since the PUCCH resource for the aperiodic CSI feedback may not be alterable, the base station 1132 may be limited to using the HARQ PRI field 1152 to indicate to the UE 1130 which PUCCH resource to use for transmitting the multiplexed aperiodic CSI and HARQ feedback 1120. As a result, when scheduling aperiodic CSI feedback and HARQ feedback using separate PUCCH resources within a same slot, the base station 1132 may be configured to transmit the downlink grant scheduling the HARQ feedback to arrive at the UE 1130 later in time (e.g., after) the downlink grant scheduling the aperiodic CSI feedback. For example, in the illustrated example of FIG. 11, the base station 1132 may be configured so that the second downlink grant 1112 triggering the HARQ feedback 1116 arrives at the UE 1130 after the first downlink grant 1102 triggering the aperiodic CSI feedback 1106.

In some examples, the DCI 1150 associated with the downlink grants may also include a multiplexing field 1154 ("MUX"). The multiplexing field 1154 may indicate to the UE 1130 whether to multiplex HARQ feedback with aperiodic CSI feedback. For example, the multiplexing field 1154 may include a first value (e.g., a "0") when the UE 1130 is not to multiplex HARQ feedback with aperiodic CSI feedback, and may include a second value (e.g., a "1") when the UE 1130 is to multiplex HARQ feedback with aperiodic CSI feedback.

It may be appreciated that the base station 1132 may include the multiplexing field 1154 in the DCI 1150 to provide an indication indicating a multiplexing behavior for the PUCCH resources (e.g., the HARQ feedback and the aperiodic CSI feedback) within a slot. The base station 1132 may provide the multiplexing behavior indication (e.g., the value of the multiplexing field 1154) to prevent miscommunication between the base station 1132 and the UE 1130. For example, due to an error in transmission, the UE 1130 may miss a downlink grant and, thus, may not calculate an aperiodic CSI report corresponding to one of the PUCCH resources of a slot. By including the multiplexing field 1154, the base station 1132 and the UE 1130 may avoid scenarios in which the UE 1130 may determine not to multiplex the HARQ feedback and the aperiodic CSI feedback based on the PUCCH resources determined by the UE 1130 and while the base station 1132 is expecting multiplexed aperiodic CSI and HARQ feedback.

The UE 1130 may then use the PUCCH resource indicated by the last PDCCH to transmit the multiplexed aperiodic CSI and HARQ feedback 1120. For example, the UE 1130 may use the second PUCCH resource 1118 indicated by the HARQ PRI field 1152 of the second downlink grant 1112 to transmit the multiplexed aperiodic CSI and HARQ feedback 1120.

Figure 12:
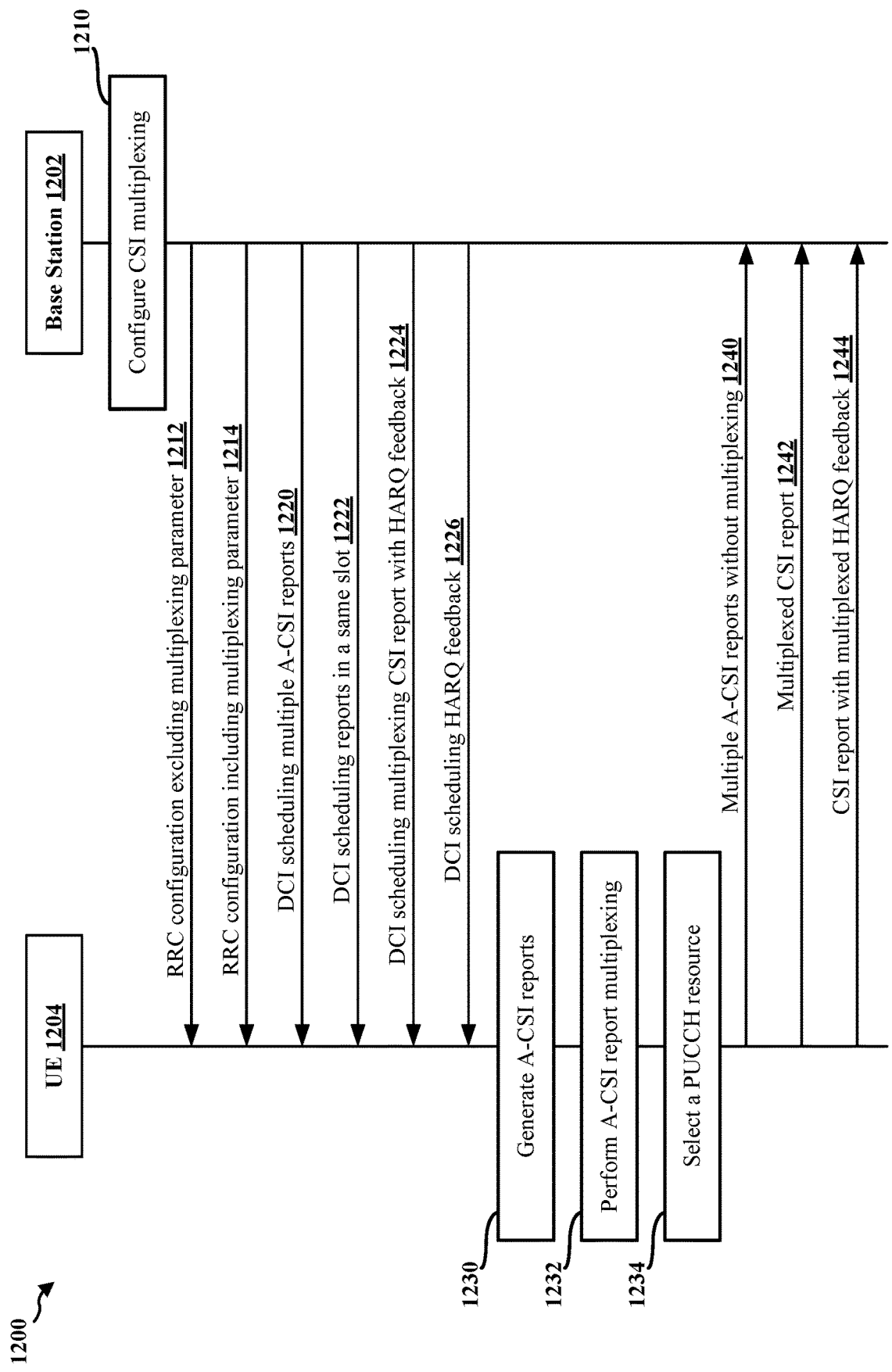
FIG. 12 is an example communication flow between a base station and a UE, in accordance with the teachings disclosed herein.

FIG. 12 illustrates an example communication flow 1200 between a base station 1202 and a UE 1204, as presented herein. In the illustrated example, the communication flow 1200 facilitates improving scheduling of the UE 1204 for A-CSI reporting. Aspects of the base station 1202 may be implemented by the base station 102/180 of FIG. 1 and/or the base station 310 of FIG. 3. Aspects of the UE 1204 may be implemented by the UE 104 of FIG. 1 and/or the UE 350 of FIG. 3. Although not shown in the illustrated example of FIG. 12, it may be appreciated that in additional or alternative examples, the base station 1202 may be in communication with one or more other base stations or UEs, and/or the UE 1204 may be in communication with one or more other base stations or UEs.

At 1210, the base station 1202 may configure CSI multiplexing at the UE 1204. In some examples, the base station 1202 may configure the UE 1204 to forego performing CSI multiplexing. For example, the base station 1202 may transmit an RRC configuration 1212 excluding a multiplexing parameter that is received by the UE 1204. The multiplexing parameter may indicate one or more PUCCH resources that the UE 1204 is to use when transmitting an A-CSI report multiplexed with additional information (e.g., another A-CSI report, HARQ feedback, etc.). When the UE 1204 is not configured with the multiplexing parameter (e.g., via the RRC configuration 1212), the UE 1204 may determine to forego performing CSI multiplexing.

As shown in FIG. 12, the base station 1202 transmits DCI 1220 scheduling multiple A-CSI reports that is received by the UE 1204. The base station 1202 may also transmit DCI 1222 scheduling reports in a same slot. Aspects of the DCI 1220 and the DCI 1222 may be implemented by the DCI 620 of FIG. 6A, the DCI 860 of FIG. 8B, the DCI 1050 of FIG. 10, and/or the DCI 1150 of FIG. 11. Referring to the example of FIG. 8A, the UE 800 may be configured to transmit two or more of the first PUCCH resource 804, the second PUCCH resource 806, the third PUCCH resource 808, and the fourth PUCCH resource 810 during the slot 802.

When the base station 1202 does not provide the multiplexing parameter to the UE 1204, the base station 1202 may schedule the multiple A-CSI reports so that the multiple A-CSI reports are less than a quantity (e.g., up to two A-CSI reports) and that the respective A-CSI reports are non-overlapping in the time domain within the slot.

At 1230, the UE 1204 generates the A-CSI reports. The UE 1204 may generate the A-CSI reports based on CSI-RS triggered by the DCI 1220 and/or the DCI 1222. For example, and referring to the example of FIGS. 6A and 6B, each downlink grant may trigger a respective CSI-RS. The UE 1204 may use the respective CSI-RS to measure the channel conditions and generate respective A-CSI reports. In some examples, the UE 1204 may generate the A-CSI reports based on respective A-CSI requests, as described in connection with the aperiodic CSI request 702 of FIG. 7.

At 1234, the UE 1204 may select a PUCCH resource to use to transmit the multiple A-CSI reports. In some examples, the UE 1204 may use the PUCCH resource associated with each downlink grant. For example, each downlink grant may schedule the UE 1204 to use a respective PUCCH resource to transmit the corresponding A-CSI report. In such examples, the UE 1204 may transmit multiple A-CSI reports 1240 that are received by the base station 1202. The UE 1204 may use the PUCCH resources associated with the respective multiple A-CSI reports to transmit the multiple A-CSI reports 1240. The UE 1204 may transmit the multiple A-CSI reports 1240 in respective PUCCH in the same slot and while foregoing CSI multiplexing.

Referring again to 1210 of FIG. 12, in some examples, the base station 1202 may configure the UE 1204 to perform CSI multiplexing. For example, the base station 1202 may transmit an RRC configuration 1214 including a multiplexing parameter that is received by the UE 1204. The multiplexing parameter may indicate one or more PUCCH resources that the UE 1204 is to use when transmitting an A-CSI report multiplexed with additional information (e.g., another A-CSI report, HARQ feedback, etc.). For example, the multiplexing parameter may include the multiplexing CSI PUCCH resource list 870 of FIG. 8B that contains a list of PUCCH resources (e.g., "PUCCH_1," ... "PUCCH_N") for the UE to use for multiplexing. The multiplexing parameter may be referred to as "multi-CSI-PUCCH-resourceList" or by any other suitable name.

At 1230, the UE 1204 may generate the A-CSI reports after receiving the DCI 1220 and/or the DCI 1222. At 1232, the UE 1204 may perform A-CSI report multiplexing and multiplex one or more of the A-CSI reports with additional information (e.g. another A-CSI report, HARQ feedback, etc.). For example, referring to the example of FIG. 8B, the UE 1204 may multiplex the three PUCCH resources 852, 854, 856 scheduled for the slot 850 into a multiplexing PUCCH 858 ("MUX PUCCH").

At 1234, the UE 1204 may select a PUCCH resource to use to transmit to the base station 1202. In some examples, the UE 1204 may select the PUCCH resource from the one or more PUCCH resources indicated by the multiplexing parameter. In some example, the UE 1204 may select the PUCCH resource based on a last PRI value indicated by the respective downlink grants. For example, the UE 1204 may select the PUCCH resource based on the value indicated by the PRI field 628 of FIG. 6A, the slot offset and PUCCH resource information 706 of FIG. 7, the PRI fields 1053 of FIG. 10, and/or the HARQ PRI field 1152 of FIG. 11.

The UE 1204 transmits a multiplexed CSI report 1242 that is received by the base station 1202. The UE 1204 may use the selected PUCCH resource to transmit the multiplexed CSI report 1242.

In some examples, the base station 1202 may schedule the UE 1204 to transmit HARQ feedback. For example, the base station 1202 may transmit DCI 1224 that is received by the UE 1204. The DCI 1224 may schedule multiplexing of a CSI report with HARQ feedback, as described in connection with the examples of FIGS. 4, 9, 10, and/or 11. For example, and referring to the example of FIG. 10, the base station 1202 may transmit the first downlink grant 1002 and trigger the UE 1204 to transmit the aperiodic CSI feedback 1006 using the first PUCCH resource 1008. The base station 1202 may also transmit the second downlink grant 1012 and trigger the UE 1204 to transmit the HARQ feedback 1016 using the second PUCCH resource 1018. As shown in FIG. 10, the first PUCCH resource 1008 and the second PUCCH resource 1018 are overlapping, at least partially, in time.

At 1232, the UE 1204 may perform A-CSI report multiplexing and multiplex one or more A-CSI reports with HARQ feedback. For example, and referring to the example of FIG. 10, the UE 1204 may generate the multiplexed aperiodic CSI and HARQ feedback 1020 based on the multiplexing of the aperiodic CSI feedback 1006 and the HARQ feedback 1016.

At 1234, the UE 1204 may select the PUCCH resource to transmit the multiplexed aperiodic CSI report and HARQ feedback to the base station 1202. In some examples, the UE 1204 may select the PUCCH resource from the one or more PUCCH resources indicated by the multiplexing parameter. In some example, the UE 1204 may select the PUCCH resource based on a last PRI value indicated by the respective downlink grants. For example, the UE 1204 may select the PUCCH resource based on the value indicated by the PRI field 628 of FIG. 6A, the slot offset and PUCCH resource information 706 of FIG. 7, the PRI fields 1053 of FIG. 10, and/or the HARQ PRI field 1152 of FIG. 11. For example, and referring to the example of FIG. 10, the UE 1204 may use the value of the HARQ PRI field 1052 or the value of the CSI PRI field 1054 to select the PUCCH resource. In some examples, the UE 1204 may use the later of the two PRI values to select the PUCCH resource.

The UE 1204 may then transmit a CSI report with multiplexed HARQ feedback 1244 that is received by the base station 1202. The UE 1204 may use the resource selected at 1234 to transmit the CSI report with multiplexed HARQ feedback 1244.

In some examples, the base station 1202 may transmit the A-CSI request to the UE 1204 at a first time and transmit a downlink grant triggering HARQ feedback at a second time after the first time. For example, the base station 1202 may transmit the DCI 1220 and/or DCI 1222 triggering aperiodic CSI feedback from the UE 1204 at a first time and may transmit DCI 1226 scheduling HARQ feedback at a second time that occurs after the first time in the time-domain. In some such examples, the DCI 1226 scheduling the HARQ feedback may indicate when the UE 1204 is to perform CSI multiplexing. For example, and referring to the example of FIG. 11, the DCI 1150 may include the multiplexing field 1154 to indicate to the UE 1204 whether to multiplex HARQ feedback with aperiodic CSI feedback. For example, the multiplexing field 1154 may include a first value (e.g., a "0") when the UE 1204 is not to multiplex HARQ feedback with aperiodic CSI feedback, and may include a second value (e.g., a "1") when the UE 1204 is to multiplex HARQ feedback with aperiodic CSI feedback.

In some examples, the UE 1204 may use the value of the multiplex field to determine whether to perform A-CSI report multiplexing at 1232. For example, and referring to the example of FIG. 11, when the multiplexing field 1154 is set to the first value (e.g., a "0"), then the UE 1204 may forego performing the A-CSI report multiplexing with HARQ feedback. In a similar manner, when the multiplexing field 1154 is set to the second value (e.g., a "1"), then the UE 1204 may perform the A-CSI report multiplexing with HARQ feedback.

At 1234, the UE 1204 may select the PUCCH resource to use for transmitting to the base station 1202. In some examples, the UE 1204 may select the PUCCH resource from the one or more PUCCH resources indicated by the multiplexing parameter. In some example, the UE 1204 may select the PUCCH resource based on a last PRI value indicated by the respective downlink grants. For example, the UE 1204 may select the PUCCH resource based on the value indicated by the PRI field 628 of FIG. 6A, the slot offset and PUCCH resource information 706 of FIG. 7, the PRI fields 1053 of FIG. 10, and/or the HARQ PRI field 1152 of FIG. 11. For example, and referring to the example of FIG. 11, the UE 1204 may use the value of the HARQ PRI field 1152 to select the PUCCH resource.

The UE 1204 may then transmit the CSI report with multiplexed HARQ feedback 1244 that is received by the base station 1202 when the DCI 1226 indicates to perform CSI multiplexing. The UE 1204 may use the resource selected at 1234 to transmit the CSI report with multiplexed HARQ feedback 1244.

Otherwise, the UE 1204 may transmit the CSI report without multiplexing the HARQ feedback. For example, the UE 1204 may transmit the CSI report using a first PUCCH resource (e.g., based on the value of the CSI PRI field 1054 of FIG. 10) and may transmit the HARQ feedback using a second PUCCH resource (e.g., based on the value of the HARQ PRI field 1052 of FIG. 10).

In some examples, the base station 1202 may configure the UE 1204 with the capability to perform CSI multiplexing while also indicating that the UE 1204 is to forego performing CSI multiplexing for a transmission. For example, the base station 1202 may transmit the RRC configuration 1214 including the multiplexing parameter and providing the UE 1204 with one or more PUCCH resources to use when performing CSI multiplexing. The base station 1202 may also transmit the DCI 1220 and the DCI 1222 scheduling multiple A-CSI reports in a same slot. However, in some examples, the base station 1202 may set the multiplexing field of the DCI 1220 and/or the DCI 1222 to a first value (e.g., a "0") to indicate no multiplexing. In some examples, the base station 1202 may use DAI fields of the DCI to provide the multiplexing behavior indications. For example, the base station 1202 may set the total DAI field of the DCI 1220 and/or the DCI 1222 to a "00" value to indicate no multiplexing. In such examples, the UE 1204 may be configured to perform CSI multiplexing (e.g., by receiving the multiplexing parameter), but may not perform CSI multiplexing for a particular transmission.

Figure 13:
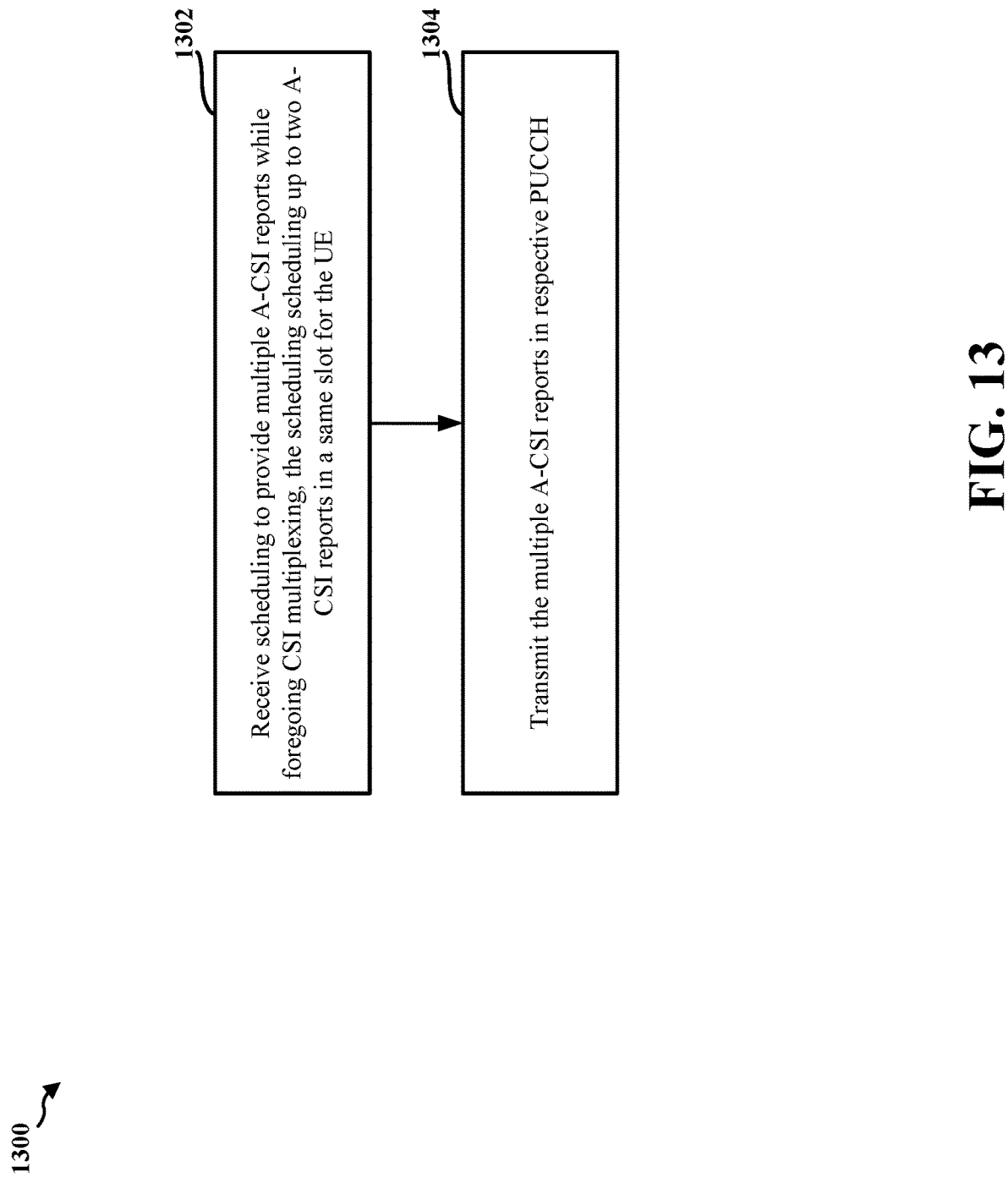
FIG. 13 is a flowchart of a method of wireless communication at a base station, in accordance with the teachings disclosed herein.

FIG. 13 is a flowchart 1300 of a method of wireless communication. The method may be performed by a UE (e.g., the UE 104, the UE 350, and/or an apparatus 1702 of FIG. 17). The method may improve scheduling of a UE for A-CSI reporting.

At 1302, the UE receives scheduling to provide A-CSI reports while foregoing A-CSI multiplexing, the scheduling for up to two A-CSI reports in a same slot for the UE, and the multiple A-CSI reports being non-overlapping in time in the same slot, as described in connection with the DCI 1220 and the DCI 1222 of FIG. 12. In some examples, the UE may receive scheduling for no more than two A-CSI reports in a same slot, where the multiple A-CSI reports do not overlap in time in the same slot. For example, if a multiplexing CSI PUCCH resource list (e.g., "multi-CSI-PUCCH-resourceList") is not configured, the UE may determine to forego performing CSI multiplexing. In such examples, the base station may schedule the transmission of the at most two A-CSI reports by the UE on PUCCH scheduled in the same slot, and that the two A-CSI reports do not overlap in time. The receiving of the scheduling, at 1302, may be performed, for example, by a CSI scheduling component 1740 and/or a reception component 1730 of the apparatus 1702 of FIG. 17.

At 1304, the UE transmits the multiple A-CSI reports to a base station in respective PUCCH in the same slot and while foregoing CSI multiplexing, as described in connection with the multiple A-CSI reports 1240 of FIG. 12. For example, the UE may transmit at most two A-CSI reports at different times in a single slot, e.g., using the resources scheduled for the UE by the base station. The UE may measure a CSI-RS to provide the A-CSI report(s). The transmitting of the multiple A-CSI reports, at 1304, may be performed by, for example, a report component 1742 and/or a transmission component 1734 of the apparatus 1702 of FIG. 17.

Figure 14:
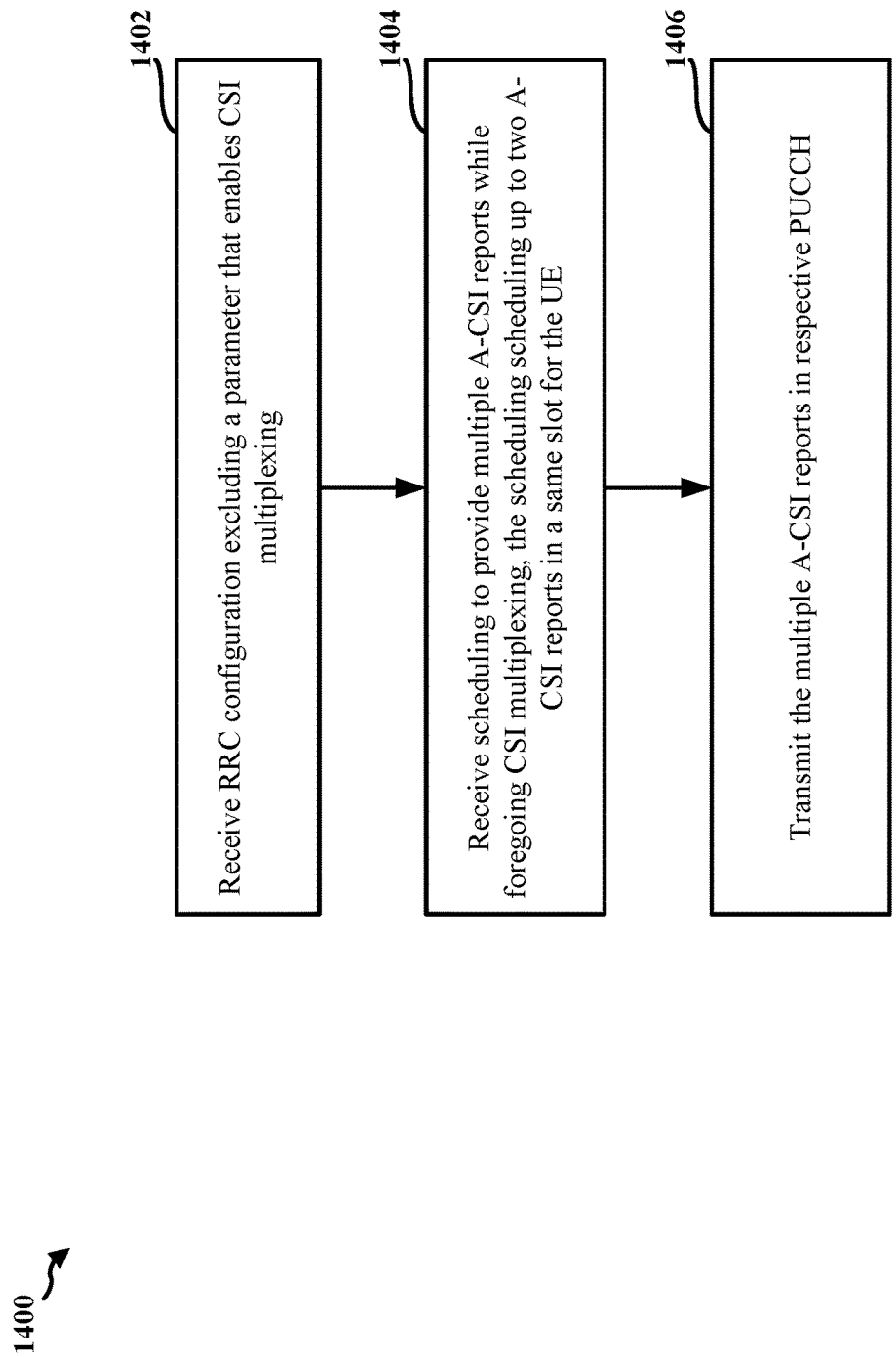
FIG. 14 is a flowchart of a method of wireless communication at a UE, in accordance with the teachings disclosed herein.

FIG. 14 is a flowchart 1400 of a method of wireless communication. The method may be performed by a UE (e.g., the UE 104, the UE 350, and/or an apparatus 1702 of FIG. 17). The method may improve scheduling of a UE for A-CSI reporting.

At 1404, the UE receives scheduling to provide A-CSI reports while foregoing A-CSI multiplexing, the scheduling for up to two A-CSI reports in a same slot for the UE, and the multiple A-CSI reports being non-overlapping in time in the same slot, as described in connection with the DCI 1220 and the DCI 1222 of FIG. 12. In some examples, the UE may receive scheduling for no more than two A-CSI reports in a same slot, where the multiple A-CSI reports do not overlap in time in the same slot. For example, if a multiplexing CSI PUCCH resource list (e.g., "multi-CSI-PUCCH-resourceList") is not configured, the UE may determine to forego performing CSI multiplexing. In such examples, the base station may schedule the transmission of the at most two A-CSI reports by the UE on PUCCH scheduled in the same slot, and that the two A-CSI reports do not overlap in time. The receiving of the scheduling, at 1404, may be performed, for example, by a CSI scheduling component 1740 and/or a reception component 1730 of the apparatus 1702 of FIG. 17.

At 1406, the UE transmits the multiple A-CSI reports to a base station in respective PUCCH in the same slot and while foregoing CSI multiplexing, as described in connection with the multiple A-CSI reports 1240 of FIG. 12. For example, the UE may transmit at most two A-CSI reports at different times in a single slot, e.g., using the resources scheduled for the UE by the base station. The UE may measure a CSI-RS to provide the A-CSI report(s). The transmitting of the multiple A-CSI reports, at 1406, may be performed by, for example, a report component 1742 and/or a transmission component 1734 of the apparatus 1702 of FIG. 17.

As illustrated at 1402, the UE may receive an RRC configuration from the base station excluding a parameter that enables CSI multiplexing, as described in connection with the RRC configuration 1212 of FIG. 12. For example, the UE may receive the RRC configuration without a multiplexing CSI PUCCH resource list (e.g., "multi-CSI-PUCCH-resourceList") configured for the UE. The receiving of the RRC configuration, at 1402, may be performed by, for example, a configuration component 1744 of the apparatus 1702 of FIG. 17.

Figure 15:
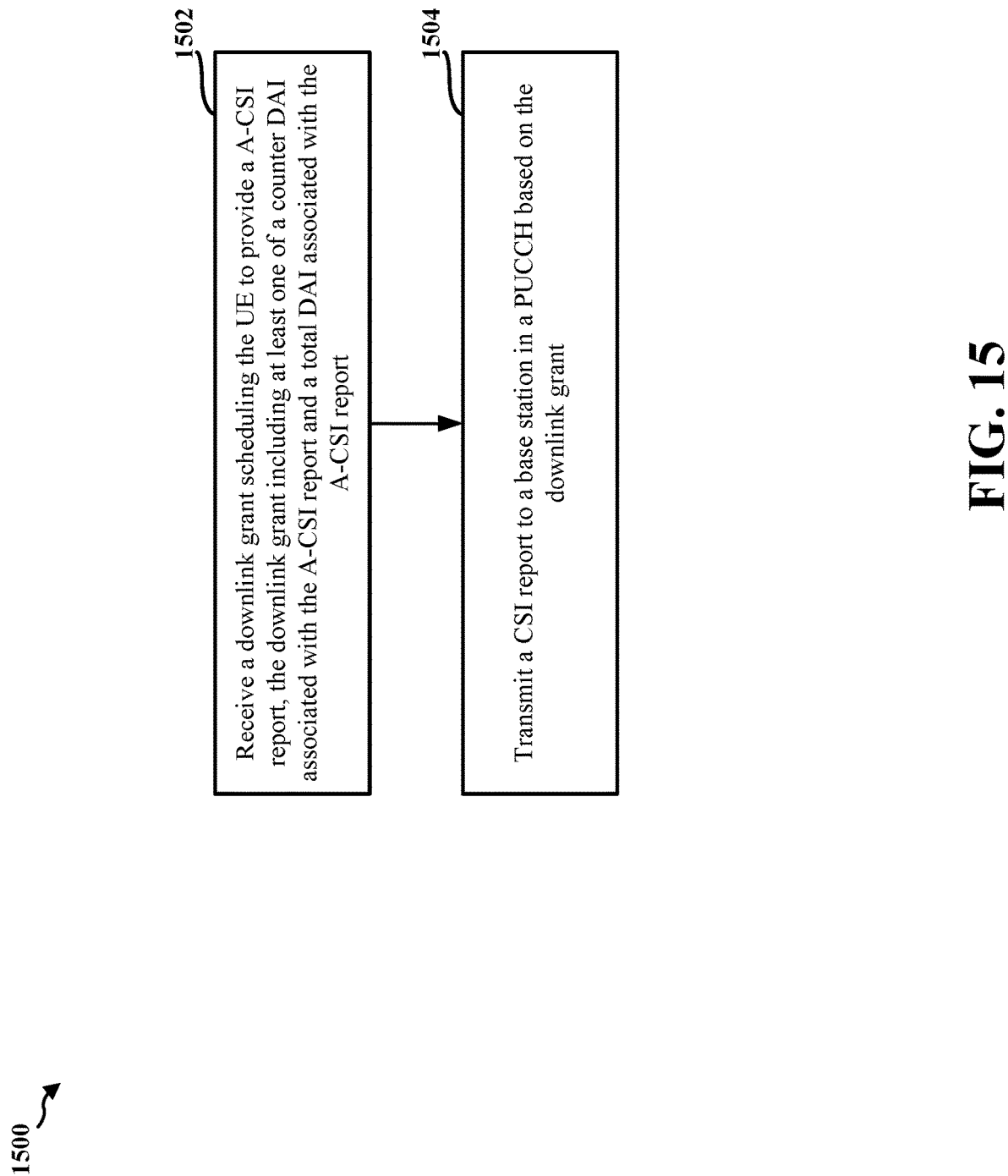
FIG. 15 is a flowchart of a method of wireless communication at a base station, in accordance with the teachings disclosed herein.

FIG. 15 is a flowchart 1500 of a method of wireless communication. The method may be performed by a UE (e.g., the UE 104, the UE 350, and/or an apparatus 1702 of FIG. 17). The method may improve scheduling of a UE for A-CSI reporting.

At 1502, the UE receives a downlink grant scheduling the UE to provide an A-CSI report, as described in connection with the DCI 620 of FIG. 6A and/or the DCI 1220 and the DCI 1222 of FIG. 12. The downlink grant may include at least one of a counter DAI associated with the A-CSI report and a total DAI associated with the A-CSI report. The counter DAI may indicate an index of the A-CSI report in an A-CSI codebook for multiplexing multiple A-CSI reports. The total DAI may indicate a total number of A-CSI reports to multiplex in a PUCCH resource. The receiving of the downlink grant, at 1502, may be performed, for example, by a CSI scheduling component 1740 and/or a reception component 1730 of the apparatus 1702 of FIG. 17.

In some examples, the total DAI codepoint (e.g., "00") may indicate that CSI multiplexing is being scheduled for the UE, the CSI multiplexing including multiplexing the A-CSI report with a second A-CSI report, as described in connection with the total DAI field 864 of FIG. 8B. In some examples, the total DAI codepoint (e.g., "00") may indicate a particular number of CSI reports to multiplex in a same PUCCH.

In some examples, a combination of the total DAI codepoint and the counter DAI may indicate that the CSI multiplexing is being scheduled for the UE, as described in connection with the counter DAI field 862 and the total DAI field 864 of FIG. 8B.

In some examples, the combination of the total DAI codepoint and the counter DAI may indicate an amount of CSI reports to multiplex in a same PUCCH transmission, as described in connection with the counter DAI field 862 and the total DAI field 864 of FIG. 8B. For example, the UE may compare the value of the counter DAI field 862 with the value of the total DAI field 864 to determine whether the UE is to perform CSI multiplexing or to determine a number of A-CSI reports to multiplex in a same PUCCH transmission.

For example, when then total DAI field 864 is set to "00" and the counter DAI field 862 is set to "01," then the UE may determine that the "00" value of the total DAI field 864 corresponds to no multiplexing. Otherwise, if the total DAI field 864 is set to "00" and the counter DAI field 862 is set to a value different than "01," then the UE may determine that the "00" value of the total DAI field 864 corresponds to multiplexing 4, 8, etc. aperiodic CSI reports.

In some examples, the downlink grant may include at least one bit that indicates that CSI multiplexing is being scheduled for the UE, the CSI multiplexing including multiplexing the A-CSI report with a second A-CSI report, as described in connection with the multiplexing field 866 of FIG. 8B. For example, the multiplexing field 866 may be set to a first value (e.g., a "0") to indicate no multiplexing, and may be set to a second value (e.g. a "1") to indicate multiplexing.

Thus, the UE may use one or more bits of the downlink grant to determine when to multiplex CSI reports and/or to determine how many CSI reports to multiplex in a single PUCCH transmission.

At 1504, the UE transmits a CSI report to a base station in a PUCCH based on the downlink grant, as described in connection with the multiplexed CSI report 1242 of FIG. 12. In some examples, the UE may measure a CSI-RS to provide the CSI report. The transmitting of the CSI report, at 1504, may be performed, for example, by a report component 1742 of the apparatus 1702 of FIG. 17.

Figure 16:
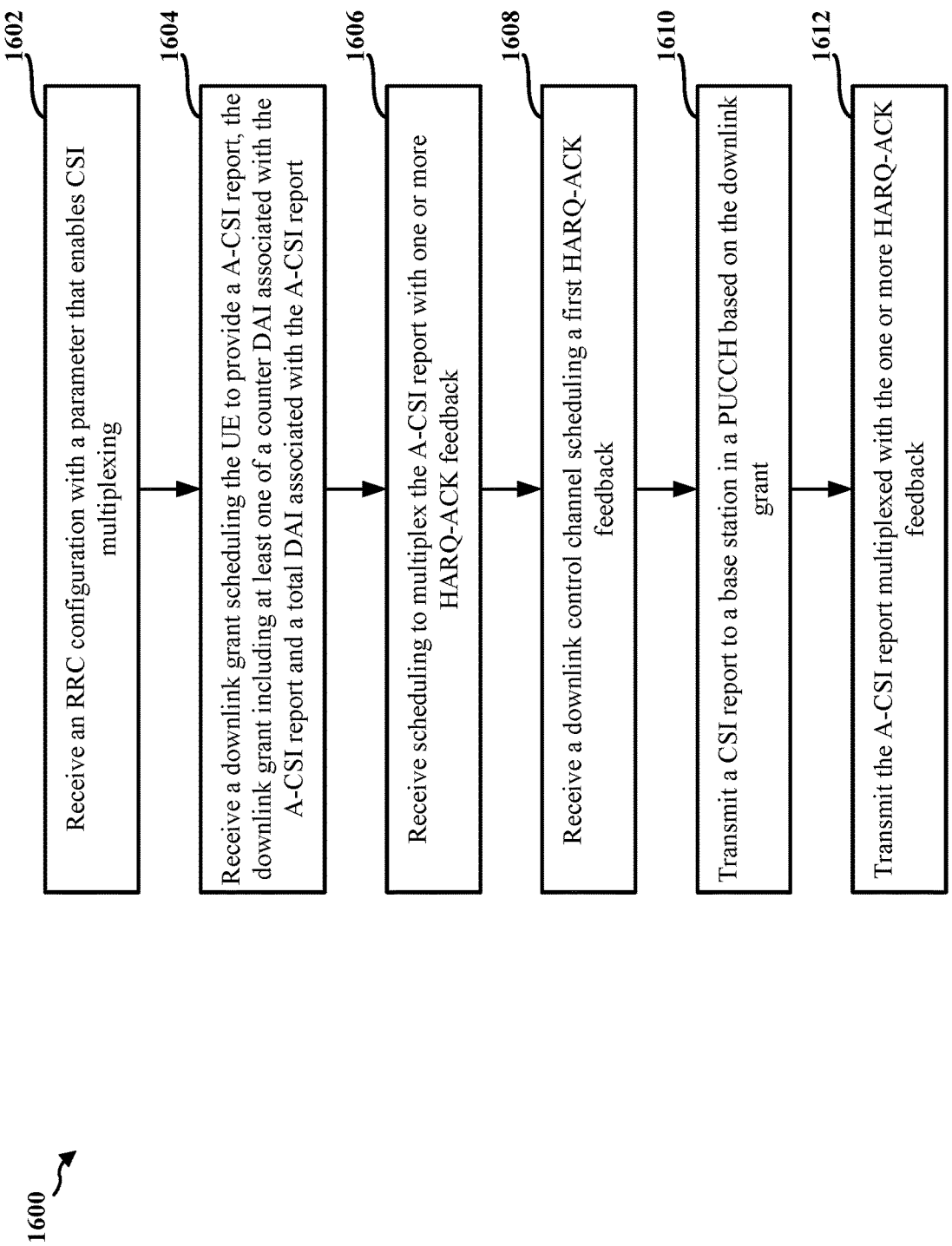
FIG. 16 is a flowchart of a method of wireless communication at a UE, in accordance with the teachings disclosed herein.

FIG. 16 is a flowchart 1600 of a method of wireless communication. The method may be performed by a UE (e.g., the UE 104, the UE 350, and/or an apparatus 1702 of FIG. 17). The method may improve scheduling of a UE for A-CSI reporting.

At 1604, the UE receives a downlink grant scheduling the UE to provide an A-CSI report, as described in connection with the DCI 620 of FIG. 6A and/or the DCI 1220 and the DCI 1222 of FIG. 12. The downlink grant may include at least one of a counter DAI associated with the A-CSI report and a total DAI associated with the A-CSI report. The counter DAI may indicate an index of the A-CSI report in an A-CSI codebook for multiplexing multiple A-CSI reports. The total DAI may indicate a total number of A-CSI reports to multiplex in a PUCCH resource. The receiving of the downlink grant, at 1604, may be performed, for example, by a CSI scheduling component 1740 and/or a reception component 1730 of the apparatus 1702 of FIG. 17.

In some examples, the total DAI codepoint (e.g., "00") may indicate that CSI multiplexing is being scheduled for the UE, the CSI multiplexing including multiplexing the A-CSI report with a second A-CSI report, as described in connection with the total DAI field 864 of FIG. 8B. In some examples, the total DAI codepoint (e.g., "00") may indicate a particular number of CSI reports to multiplex in a same PUCCH.

In some examples, a combination of the total DAI codepoint and the counter DAI may indicate that the CSI multiplexing is being scheduled for the UE, as described in connection with the counter DAI field 862 and the total DAI field 864 of FIG. 8B.

In some examples, the combination of the total DAI codepoint and the counter DAI may indicate an amount of CSI reports to multiplex in a same PUCCH transmission, as described in connection with the counter DAI field 862 and the total DAI field 864 of FIG. 8B. For example, the UE may compare the value of the counter DAI field 862 with the value of the total DAI field 864 to determine whether the UE is to perform CSI multiplexing or to determine a number of A-CSI reports to multiplex in a same PUCCH transmission.

For example, when then total DAI field 864 is set to "00" and the counter DAI field 862 is set to "01," then the UE may determine that the "00" value of the total DAI field 864 corresponds to no multiplexing. Otherwise, if the total DAI field 864 is set to "00" and the counter DAI field 862 is set to a value different than "01," then the UE may determine that the "00" value of the total DAI field 864 corresponds to multiplexing 4, 8, etc. aperiodic CSI reports.

In some examples, the downlink grant may include at least one bit that indicates that CSI multiplexing is being scheduled for the UE, the CSI multiplexing including multiplexing the A-CSI report with a second A-CSI report, as described in connection with the multiplexing field 866 of FIG. 8B. For example, the multiplexing field 866 may be set to a first value (e.g., a "0") to indicate no multiplexing, and may be set to a second value (e.g. a "1") to indicate multiplexing.

Thus, the UE may use one or more bits of the downlink grant to determine when to multiplex CSI reports and/or to determine how many CSI reports to multiplex in a single PUCCH transmission.

At 1610, the UE transmits a CSI report to a base station in a PUCCH based on the downlink grant, as described in connection with the multiplexed CSI report 1242 of FIG. 12. In some examples, the UE may measure a CSI-RS to provide the CSI report. The transmitting of the CSI report, at 1610, may be performed, for example, by a report component 1742 of the apparatus 1702 of FIG. 17.

In some examples, the UE may be configured to perform CSI multiplexing. For example, at 1602, the UE receive an RRC configuration including a parameter that enables CSI multiplexing, as described in connection with the multiplexing CSI PUCCH resource list 870 of FIG. 8B and/or the RRC configuration 1214 of FIG. 12. For example, the RRC configuration may include a multiplexing CSI PUCCH resource list (e.g., "multi-CSI-PUCCH-resourceList") configured for the UE. In some examples, the multiplexing CSI PUCCH resource list may indicate one or more PUCCH resources to use to transmit multiplexed A-CSI reports. In some examples, the PUCCH resource used to transmit the CSI report (e.g., at 1610) may be included in the one or more PUCCH resources. In such examples, the UE may select the PUCCH resource based on a payload size of the multiplexed A-CSI reports. That is, one or more of the PUCCH resources included in the one or more PUCCH resources may be configured to accommodate different payload sizes. The receiving of the RRC configuration, at 1602, may be performed, for example, by a configuration component 1744 of the apparatus 1702 of FIG. 17.

In some examples, the UE may be configured to multiplex CSI reports with HARQ feedback. For example, at 1606, the UE may receive scheduling to multiplex the A-CSI report with one or more HARQ-ACK feedback, as described in connection with the DCI 1050 of FIG. 10 and/or the DCI 1224 of FIG. 12. The receiving of the scheduling to multiplex the A-CSI report with one or more HARQ-ACK feedback, at 1606, may be performed, for example, by the CSI scheduling component 1740 of the apparatus 1702 of FIG. 17.

In some examples, a PRI in a last downlink grant may indicate a second PUCCH resource for the UE to use for the A-CSI report multiplexed with the one or more HARQ-ACK feedback, as described in connection with the second downlink grant 1012 of FIG. 10.

In some examples, the UE may receive (e.g., at 1604) multiple PRI values in each downlink grant, as described in connection with the HARQ PRI field 1052 and the CSI PRI field 1054 of FIG. 10. For example, the UE may receive a first PRI value associated with the one or more HARQ-ACK feedback and a second PRI value associated with the A-CSI report. In such examples, the UE may transmit, at 1612, the A-CSI report multiplexed with the one or more HARQ-ACK feedback based on a last indicated PRI value among the first PRI value and the second PRI value, as described in connection with the multiplexed aperiodic CSI and HARQ feedback 1020 of FIG. 10 and/or the CSI report with multiplexed HARQ feedback 1244 of FIG. 12. The transmitting of the A-CSI report multiplexed with the one or more HARQ-ACK feedback, at 1612, may be performed, for example, by the report component 1742 of the apparatus 1702 of FIG. 17.

In some examples, the transmitting of the A-CSI report and the HARQ-ACK feedback may be based on DAIs, as described in connection with the HARQ DAI fields 1057 and the CSI DAI fields 1061 of FIG. 10. For example, the UE may receive a first counter DAI associated with the A-CSI report, a first total DAI associated with the A-CSI report, a second counter DAI associated with the one or more HARQ-ACK feedback, and a second total DAI associated with the one or more HARQ-ACK feedback.

In some examples, the CSI report may include a concatenation of the one or more HARQ-ACK feedback based on a first codebook and the A-CSI report based on a second codebook, as described in connection with the HARQ-ACK codebook 1021 and the aperiodic CSI codebook 1022 of FIG. 10. For example, the UE may determine the HARQ-ACK codebook and the A-CSI report codebook separately, and may concatenate the HARQ-ACK and A-CSI report together after application of the respective codebooks.

As illustrated at 1608, the UE may receive a downlink control channel scheduling a first HARQ-ACK feedback, as described in connection with the DCI 1150 of FIG. 11 and/or the DCI 1226 of FIG. 12. The UE may receive the downlink control channel after receiving the downlink grant scheduling the UE to provide the A-CSI report (e.g., at 1604). The receiving of the downlink control channel scheduling the first HARQ-ACK feedback, at 1608 may be performed by a HARQ-ACK component 1746 and/or the reception component 1730 of the apparatus 1702 of FIG. 17.

In some examples, the downlink control channel scheduling the first HARQ-ACK feedback may include an indication to multiplex the one or more HARQ-ACK feedback with the A-CSI report, as described in connection with the multiplexing field 1154 of FIG. 11.

In some examples, a third PUCCH resource associated with the first HARQ-ACK feedback may be indicated by a HARQ-ACK PRI in a last PDCCH that schedules the first HARQ-ACK feedback, as described in connection with the HARQ PRI field 1152 of FIG. 11.

Figure 17:
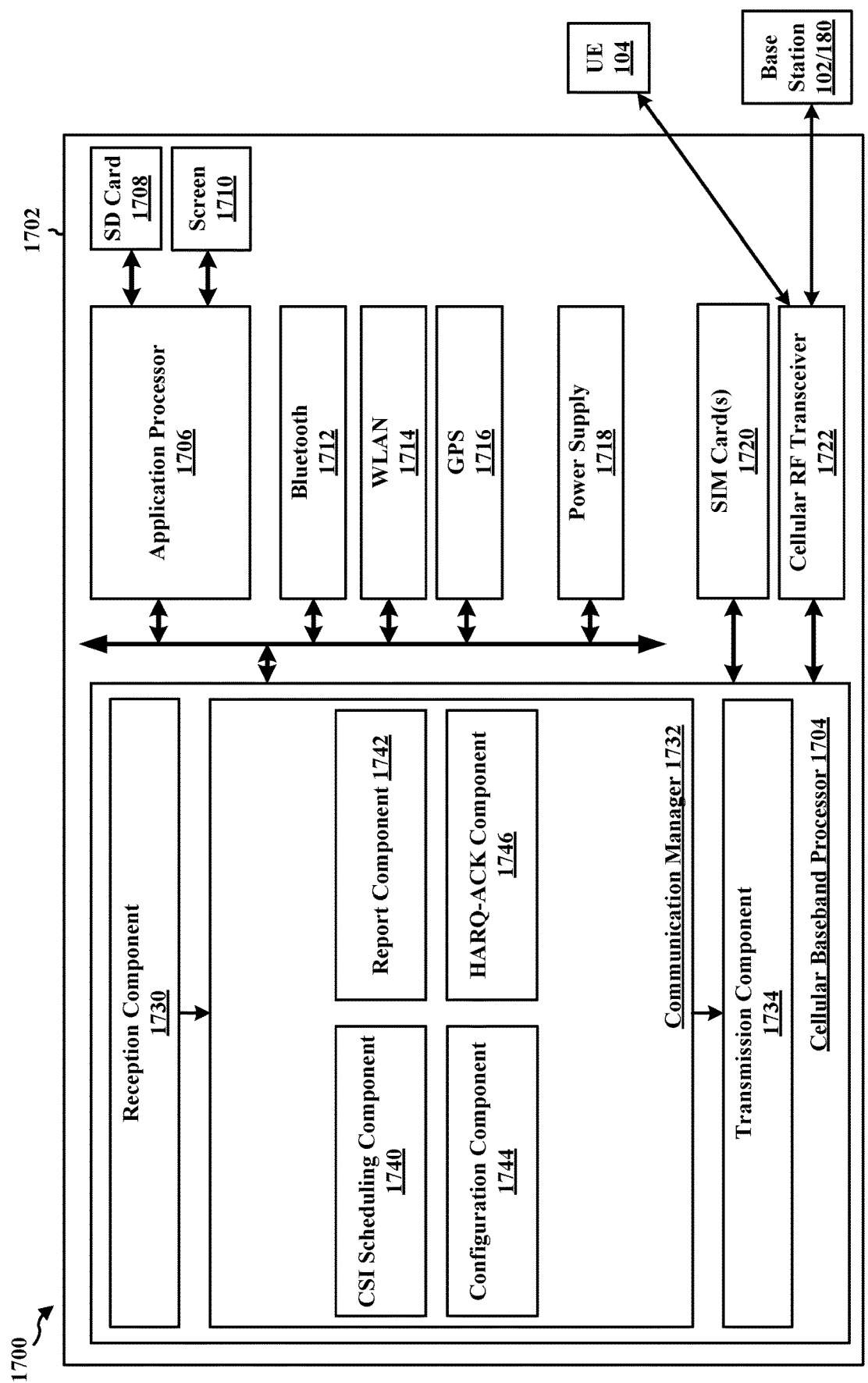
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or base station 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the cellular baseband processor 1704, and in another configuration, the apparatus 1702 may be the entire UE (e.g., see the UE 350 of FIG. 3) and include the additional modules of the apparatus 1702.

The communication manager 1732 includes a CSI scheduling component 1740 that is configured to receive scheduling to provide multiple A-CSI reports while foregoing CSI multiplexing, the scheduling for up to two A-CSI reports in a same slot for the UE, for example, as described in connection with 1302 of FIG. 13 and/or 1404 of FIG. 14. The example CSI scheduling component 1740 may also be configured to receive a downlink grant scheduling the UE to provide a A-CSI report, the downlink grant including at least one of a counter DAI associated with the A-CSI report and a total DAI associated with the A-CSI report, for example, as described in connection with 1502 of FIG. 15 and/or 1604 of FIG. 16. The example CSI scheduling component 1740 may also be configured to receive scheduling to multiplex the A-CSI report with one or more HARQ-ACK feedback, for example, as described in connection with 1606 of FIG. 16.

The communication manager 1732 also includes a report component 1742 that is configured to transmit the multiple A-CSI reports in respective PUCCH, for example, as described in connection with 1304 of FIG. 13 and/or 1406 of FIG. 14. The example report component 1742 may also be configured to transmit a CSI report to a base station in a PUCCH based on the downlink grant, for example, as described in connection with 1504 of FIG. 15 and/or 1610 of FIG. 16. The example report component 1742 may also be configured to transmit the A-CSI report multiplexed with the one or more HARQ-ACK feedback, for example, as described in connection with 1612 of FIG. 16.

The communication manager 1732 also includes a configuration component 1744 that is configured to receive RRC configuration excluding a parameter that enables CSI multiplexing, for example, as described in connection with 1402 of FIG. 14. The example configuration component 1744 may also be configured to receive an RRC configuration with a parameter that enables CSI multiplexing, for example, as described in connection with 1602 of FIG. 16.

The communication manager 1732 also includes a HARQ-ACK component 1746 that is configured to receive a downlink control channel scheduling a first HARQ-ACK feedback, for example, as described in connection with 1608 of FIG. 16.

The apparatus may include additional components that perform each of the blocks of the algorithm in the flowcharts of FIGS. 13, 14, 15, and/or 16. As such, each block in the flowcharts of FIGS. 13, 14, 15, and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for receiving scheduling to provide multiple A-CSI reports while foregoing A-CSI multiplexing, the scheduling for up to two A-CSI reports in a same slot for the UE, and the multiple A-CSI reports being non-overlapping in time in the same slot. The example apparatus 1702 also includes means for transmitting the multiple A-CSI reports to a base station in respective PUCCH in the same slot and while foregoing CSI multiplexing.

In another configuration, the example apparatus 1702 also includes means for receiving an RRC configuration from the base station excluding a parameter that enables CSI multiplexing.

In another configuration, the apparatus 1702, and in particular the cellular baseband processor 1704, includes means for receiving a downlink grant scheduling the UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. The example apparatus 1702 also includes means for transmitting a CSI report to a base station in a PUCCH based on the downlink grant.

In another configuration, the example apparatus 1702 also includes means for receiving a radio resource control configuration including a parameter that enables CSI multiplexing, the parameter enabling the CSI multiplexing indicating one or more PUCCH resources associated with the UE to use to transmit multiplexed CSI reports. The example apparatus 1702 also includes means for selecting the PUCCH resource based on a payload size of the multiplexed CSI reports.

In another configuration, the example apparatus 1702 also includes means for receiving scheduling to multiplex the A-CSI report with one or more HARQ-ACK feedback.

In another configuration, the example apparatus 1702 also includes means for receiving, in each downlink grant, multiple PRI values, a first PRI value associated with the one or more HARQ-ACK feedback and a second PRI value associated with the A-CSI report. The example apparatus 1702 also includes means for transmitting the A-CSI report multiplexed with the one or more HARQ-ACK feedback based on a last indicated PRI value among the first PRI value and the second PRI value.

In another configuration, the example apparatus 1702 also includes means for receiving, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and where the CSI report includes a concatenation of the one or more HARQ-ACK feedback based on a first codebook and the A-CSI report based on a second codebook.

In another configuration, the example apparatus 1702 also includes means for receiving a downlink control channel scheduling a first HARQ-ACK feedback after receiving the downlink grant scheduling the UE to provide the A-CSI report, the downlink control channel scheduling the first HARQ-ACK feedback including an indication to multiplex the one or more HARQ-ACK feedback with the A-CSI report.

The means may be one or more of the components of the apparatus 1702 configured to perform the functions recited by the means. As described supra, the apparatus 1702 may include the TX processor 368, the RX processor 356, and the controller/processor 359. As such, in one configuration, the means may be the TX processor 368, the RX processor 356, and the controller/processor 359 configured to perform the functions recited by the means.

Figure 18:
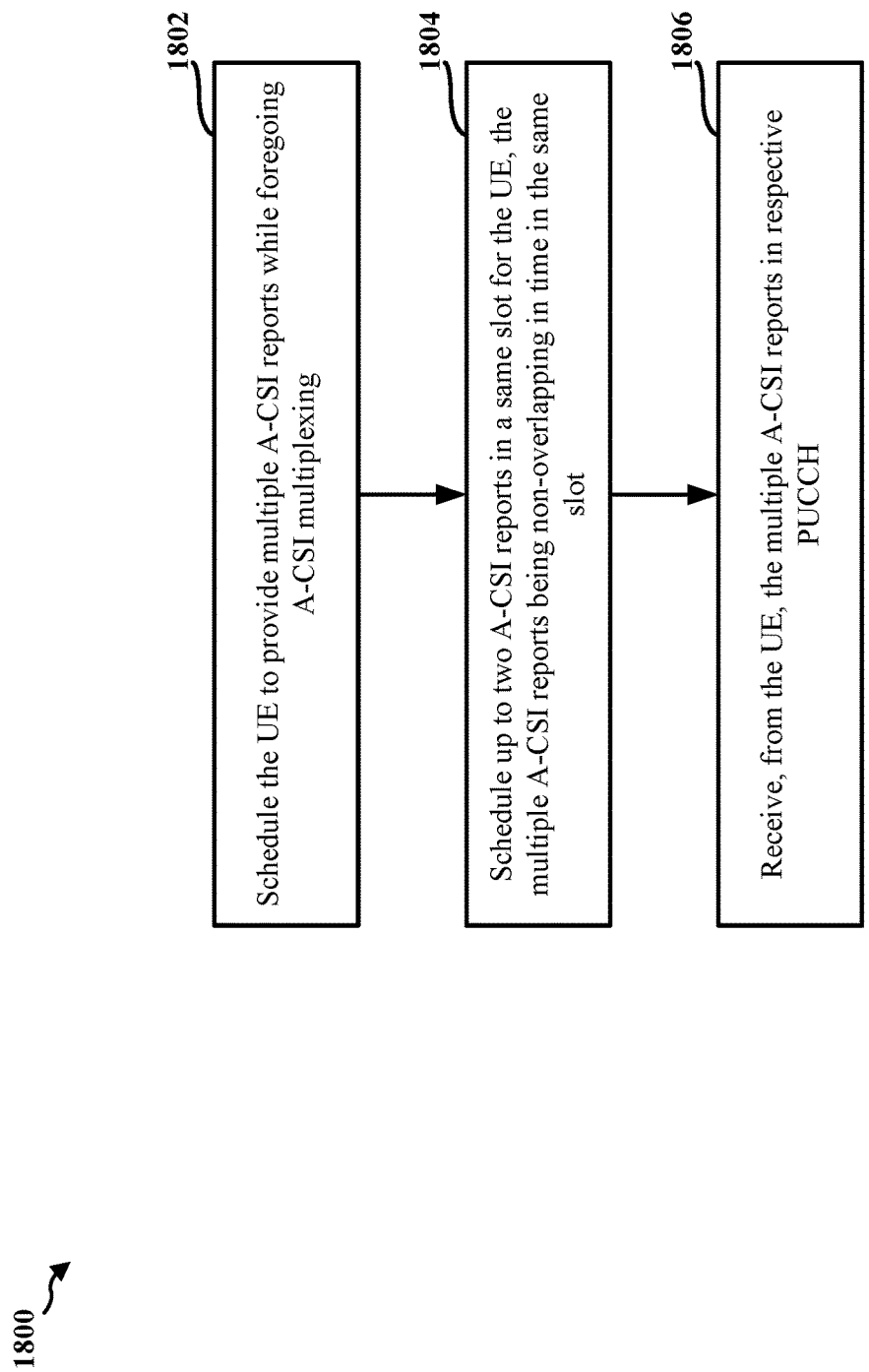
FIG. 18 is a flowchart of a method of wireless communication at a base station, in accordance with the teachings disclosed herein.

FIG. 18 is a flowchart 1800 of a method of wireless communication. The method may be performed by a base station (e.g., the base station 102/180, the base station 310, and/or an apparatus 2202 of FIG. 22). The method may improve scheduling of a UE for A-CSI reporting.

At 1802, the base station schedules the UE to provide multiple A-CSI reports while forgoing A-CSI multiplexing, as described in connection with the DCI 1220 of FIG. 12. The scheduling of the multiple A-CSI reports while forgoing A-CSI multiplexing, at 1802, may be performed by a scheduling component 2242 of the apparatus 2202 of FIG. 22.

At 1804, the base station schedules up to two A-CSI reports in a same slot for the UE, the multiple A-CSI reports being non-overlapping in time in the same slot, as described in connection with the DCI 1222 of FIG. 12. For example, if the multiplexing CSI PUCCH resource list (e.g., "multi-CSI-PUCCH-resourceList") is not configured, then the UE is not configured to perform A-CSI multiplexing. In such examples, the base station may schedule at most two A-CSI reports on PUCCH resources scheduled in the same slot, and that the two A-CSI reports do not overlap in time. The scheduling of the up to two A-CSI reports in the same slot, at 1804, may be performed by the scheduling component 2242 of the apparatus 2202 of FIG. 22.

At 1806, the base station receives, from the UE, the multiple A-CSI reports in respective PUCCH, as described in connection with the multiple A-CSI reports 1240 of FIG. 12. For example, the base station may receive the at most two A-CSI reports at different times in a single slot, e.g., using the resources scheduled by the base station. The receiving of the multiple A-CSI reports, at 1806, may be performed by a report component 2244 of the apparatus 2202 of FIG. 22. In some examples, the multiple A-CSI reports may be based on a CSI-RS transmitted to the UE.

Figure 19:
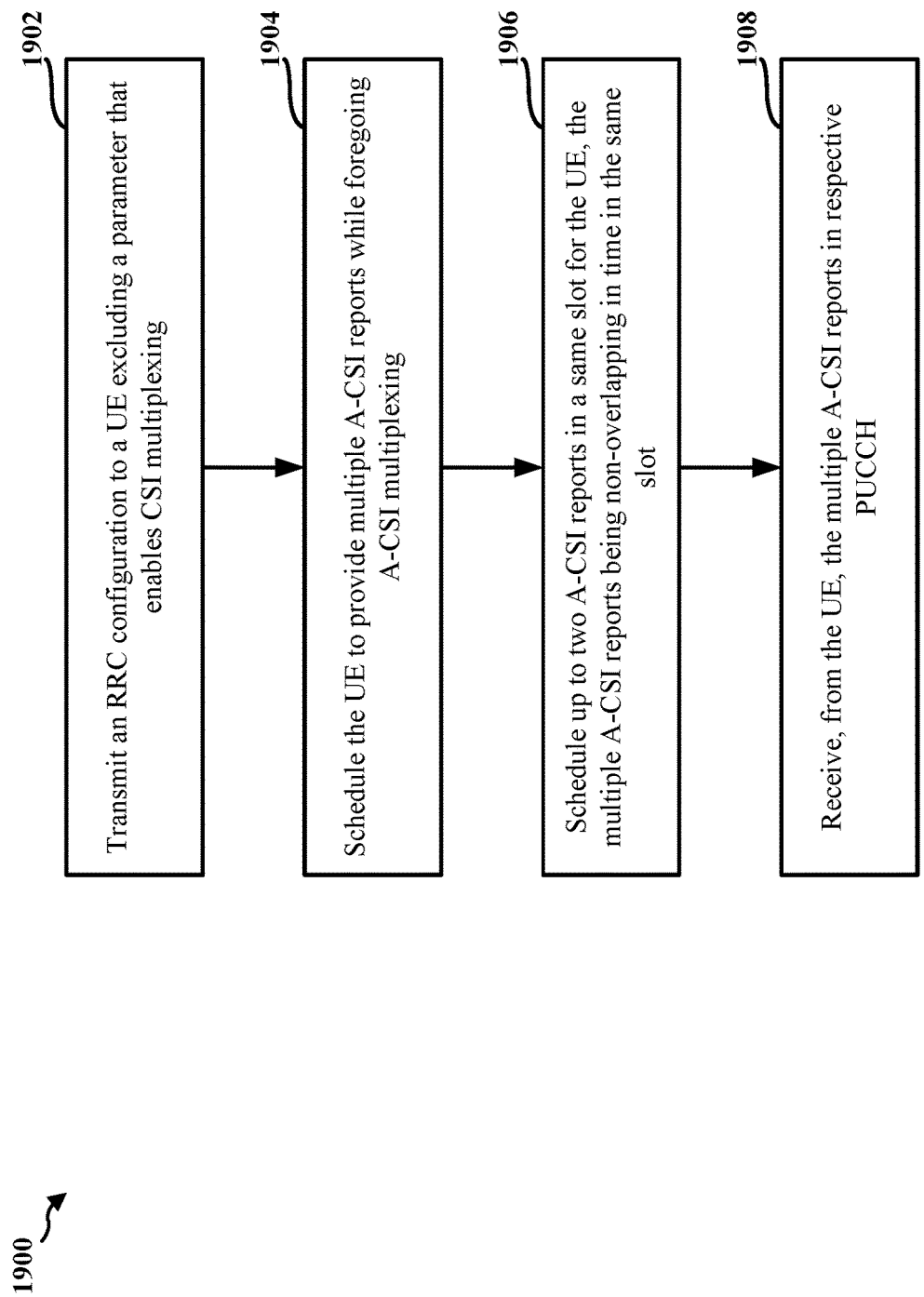
FIG. 19 is a flowchart of a method of wireless communication at a base station, in accordance with the teachings disclosed herein.

FIG. 19 is a flowchart 1900 of a method of wireless communication. The method may be performed by a base station (e.g., the base station 102/180, the base station 310, and/or an apparatus 2202 of FIG. 22). The method may improve scheduling of a UE for A-CSI reporting.

As illustrated at 1902, the base station may transmit an RRC configuration to the UE excluding a parameter that enables CSI multiplexing, as described in connection with the RRC configuration 1212 of FIG. 12. For example, the base station may transmit the RRC configuration without a multiplexing CSI PUCCH resource list (e.g., "multi-CSI-PUCCH-resourceList") configured for the UE. The transmitting of the RRC configuration, at 1902, may be performed by a configuration component 2240 of the apparatus 2202 of FIG. 22.

At 1904, the base station schedules the UE to provide multiple A-CSI reports while forgoing A-CSI multiplexing, as described in connection with the DCI 1220 of FIG. 12. The scheduling of the multiple A-CSI reports while forgoing A-CSI multiplexing, at 1904, may be performed by a scheduling component 2242 of the apparatus 2202 of FIG. 22.

At 1906, the base station schedules up to two A-CSI reports in a same slot for the UE, the multiple A-CSI reports being non-overlapping in time in the same slot, as described in connection with the DCI 1222 of FIG. 12. For example, if the multiplexing CSI PUCCH resource list (e.g., "multi-CSI-PUCCH-resourceList") is not configured, then the UE is not configured to perform A-CSI multiplexing. In such examples, the base station may schedule at most two A-CSI reports on PUCCH resources scheduled in the same slot, and that the two A-CSI reports do not overlap in time. The scheduling of the up to two A-CSI reports in the same slot, at 1906, may be performed by the scheduling component 2242 of the apparatus 2202 of FIG. 22.

At 1908, the base station receives, from the UE, the multiple A-CSI reports in respective PUCCH, as described in connection with the multiple A-CSI reports 1240 of FIG. 12. For example, the base station may receive the at most two A-CSI reports at different times in a single slot, e.g., using the resources scheduled by the base station. The receiving of the multiple A-CSI reports, at 1908, may be performed by a report component 2244 of the apparatus 2202 of FIG. 22. In some examples, the multiple A-CSI reports may be based on a CSI-RS transmitted to the UE.

Figure 20:
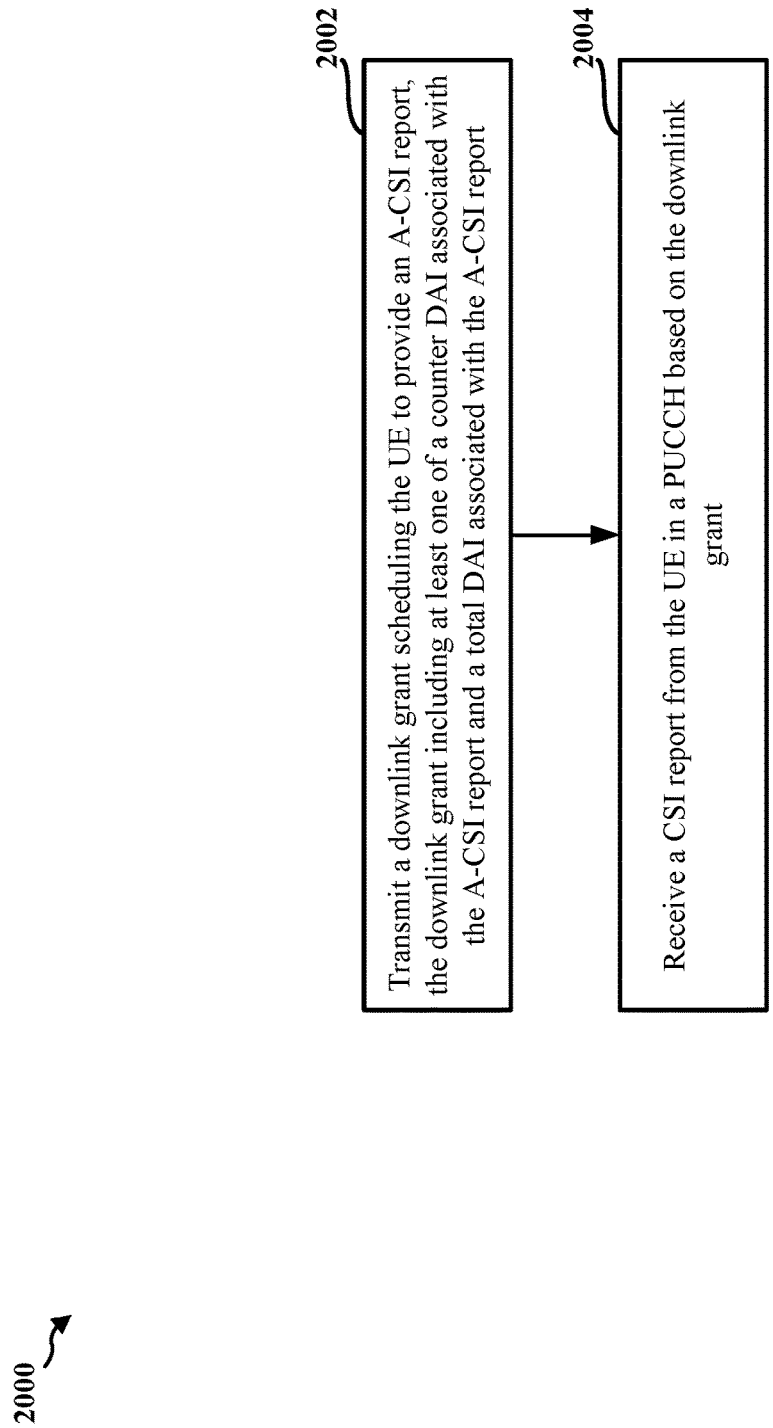
FIG. 20 is a flowchart of a method of wireless communication at a base station, in accordance with the teachings disclosed herein.

FIG. 20 is a flowchart 2000 of a method of wireless communication. The method may be performed by a base station (e.g., the base station 102/180, the base station 310, and/or an apparatus 2202 of FIG. 22). The method may improve scheduling of a UE for A-CSI reporting.

At 2002, the base station transmits a downlink grant scheduling the UE to provide an A-CSI report, the downlink grant including at least one of a counter DAI associated with the A-CSI report and a total DAI associated with the A-CSI report, as described in connection with the DCI 620 of FIG. 6A and/or the DCI 1220 and the DCI 1222 of FIG. 12. The counter DAI may indicate an index of the A-CSI report in an A-CSI codebook for multiplexing multiple A-CSI reports and the total DAI may indicate a total number of A-CSI reports to multiplex in a PUCCH resource. The transmitting of the downlink grant scheduling the UE to provide the A-CSI report, at 2002 may be performed by, for example, a scheduling component 2242 and/or a transmission component 2234 of the apparatus 2202 of FIG. 22.

In some examples, a total DAI codepoint (e.g., "00") may indicate that CSI multiplexing is being scheduled for the UE, the CSI multiplexing including multiplexing the A-CSI report with a second A-CSI report, as described in connection with the total DAI field 864 of FIG. 8B. In some examples, the total DAI codepoint (e.g., "00") may indicate a particular number of CSI reports to multiplex in a same PUCCH.

In some examples, a combination of the total DAI codepoint and the counter DAI may indicate that the CSI multiplexing is being scheduled for the UE and/or an amount of CSI reports to multiplex in a same PUCCH transmission, as described in connection with the counter DAI field 862 and the total DAI field 864 of FIG. 8B. For example, the base station may use a contrast between the counter DAI with the total DAI to indicate whether the UE is to perform CSI multiplexing or to indicate a number of A-CSI reports to be multiplexed in a same PUCCH transmission. For example, when then total DAI field 864 is set to "00" and the counter DAI field 862 is set to "01," then the base station may indicate that the "00" value of the total DAI field 864 corresponds to no multiplexing. Otherwise, if the total DAI field 864 is set to "00" and the counter DAI field 862 is set to a value different than "01," then the base station may indicate that the "00" value of the total DAI field 864 corresponds to multiplexing 4, 8, etc. aperiodic CSI reports.

In some examples, the downlink grant may include at least one bit that indicates that CSI multiplexing is being scheduled for the UE, the CSI multiplexing including multiplexing the A-CSI report with a second A-CSI report, as described in connection with the multiplexing field 866 of FIG. 8B. For example, the multiplexing field 866 may be set to a first value (e.g., a "0") to indicate no multiplexing, and may be set to a second value (e.g. a "1") to indicate multiplexing.

Thus, the base station may use one or more bits of the downlink grant to indicate when to multiplex CSI reports and/or to indicate how many CSI reports to multiplex in a single PUCCH transmission.

At 2004, the base station receives a CSI report from the UE in a PUCCH based on the downlink grant, as described in connection with the multiplexed CSI report 1242 and/or the CSI report with multiplexed HARQ feedback 1244 of FIG. 12. The receiving of the CSI report from the UE in the PUCCH, at 2004, may be performed by, for example, a report component 2244 of the apparatus 2202 of FIG. 22. In some examples, the A-CSI report(s) and the CSI report may be based on CSI-RS transmitted by the base station.

Figure 21:
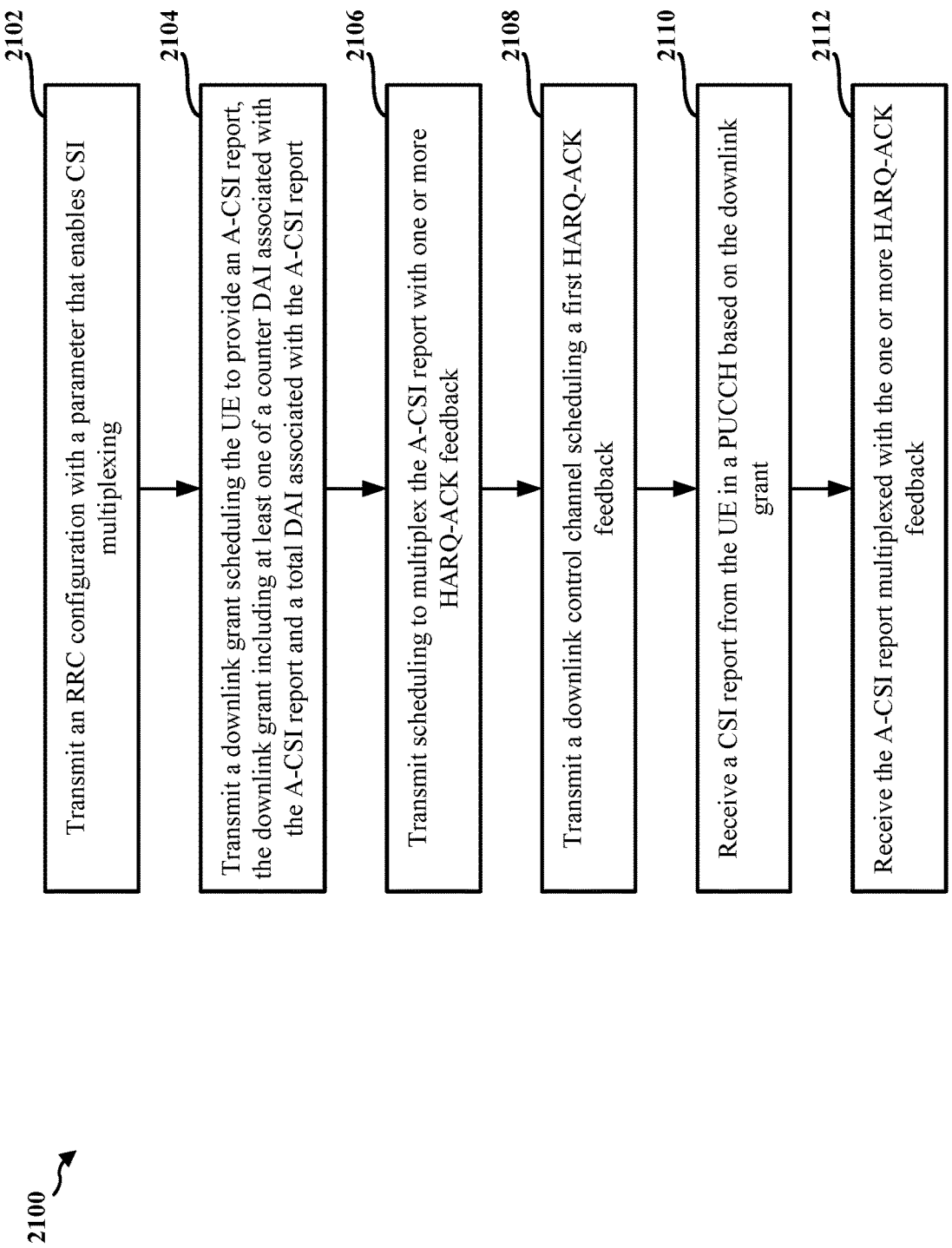
FIG. 21 is another flowchart of a method of wireless communication at a base station, in accordance with the teachings disclosed herein.

FIG. 21 is a flowchart 2100 of a method of wireless communication. The method may be performed by a base station (e.g., the base station 102/180, the base station 310, and/or an apparatus 2202 of FIG. 22). The method may improve scheduling of a UE for A-CSI reporting.

At 2104, the base station transmits a downlink grant scheduling the UE to provide an A-CSI report, the downlink grant including at least one of a counter DAI associated with the A-CSI report and a total DAI associated with the A-CSI report, as described in connection with the DCI 620 of FIG. 6A and/or the DCI 1220 and the DCI 1222 of FIG. 12. The counter DAI may indicate an index of the A-CSI report in an A-CSI codebook for multiplexing multiple A-CSI reports and the total DAI may indicate a total number of A-CSI reports to multiplex in a PUCCH resource. The transmitting of the downlink grant scheduling the UE to provide the A-CSI report, at 2104 may be performed by, for example, a scheduling component 2242 and/or a transmission component 2234 of the apparatus 2202 of FIG. 22.

In some examples, a total DAI codepoint (e.g., "00") may indicate that CSI multiplexing is being scheduled for the UE, the CSI multiplexing including multiplexing the A-CSI report with a second A-CSI report, as described in connection with the total DAI field 864 of FIG. 8B. In some examples, the total DAI codepoint (e.g., "00") may indicate a particular number of CSI reports to multiplex in a same PUCCH.

In some examples, a combination of the total DAI codepoint and the counter DAI may indicate that the CSI multiplexing is being scheduled for the UE and/or an amount of CSI reports to multiplex in a same PUCCH transmission, as described in connection with the counter DAI field 862 and the total DAI field 864 of FIG. 8B. For example, the base station may use a contrast between the counter DAI with the total DAI to indicate whether the UE is to perform CSI multiplexing or to indicate a number of A-CSI reports to be multiplexed in a same PUCCH transmission. For example, when then total DAI field 864 is set to "00" and the counter DAI field 862 is set to "01," then the base station may indicate that the "00" value of the total DAI field 864 corresponds to no multiplexing. Otherwise, if the total DAI field 864 is set to "00" and the counter DAI field 862 is set to a value different than "01," then the base station may indicate that the "00" value of the total DAI field 864 corresponds to multiplexing 4, 8, etc. aperiodic CSI reports.

In some examples, the downlink grant may include at least one bit that indicates that CSI multiplexing is being scheduled for the UE, the CSI multiplexing including multiplexing the A-CSI report with a second A-CSI report, as described in connection with the multiplexing field 866 of FIG. 8B. For example, the multiplexing field 866 may be set to a first value (e.g., a "0") to indicate no multiplexing, and may be set to a second value (e.g. a "1") to indicate multiplexing.

Thus, the base station may use one or more bits of the downlink grant to indicate when to multiplex CSI reports and/or to indicate how many CSI reports to multiplex in a single PUCCH transmission.

At 2110, the base station receives a CSI report from the UE in a PUCCH based on the downlink grant, as described in connection with the multiplexed CSI report 1242 and/or the CSI report with multiplexed HARQ feedback 1244 of FIG. 12. The receiving of the CSI report from the UE in the PUCCH, at 2110, may be performed by, for example, a report component 2244 of the apparatus 2202 of FIG. 22. In some examples, the A-CSI report(s) and the CSI report may be based on CSI-RS transmitted by the base station.

In some examples, the base station may configure the UE to perform CSI multiplexing. For example, at 2102, the base station may transmit an RRC configuration to the UE with a parameter that enables CSI multiplexing, as described in connection with the multiplexing CSI PUCCH resource list 870 of FIG. 8B and/or the RRC configuration 1214 of FIG. 12. For example, the RRC configuration may include a multiplexing CSI PUCCH resource list (e.g., "multi-CSI- PUCCH-resourceList") configured for the UE. In some examples, the multiplexing CSI PUCCH resource list may indicate one or more PUCCH resources to use to transmit multiplexed A-CSI reports. In some examples, the PUCCH resource may be selected from the one or more PUCCH resources to accommodate a payload size of the multiplexed A-CSI reports. The transmitting of the RRC configuration, at 2102, may be performed by, for example, a configuration component 2240 of the apparatus 2202 of FIG. 22.

In some examples, the base station may configure the UE to multiplex CSI reports with HARQ feedback. For example, at 2106, the base station may transmit scheduling to multiplex the A-CSI report with one or more HARQ-ACK feedback, as described in connection with the DCI 1050 of FIG. 10 and/or the DCI 1224 of FIG. 12. The transmitting of the scheduling to multiplex the A-CSI report with one or more HARQ-ACK feedback, at 2106, may be performed by, for example, the scheduling component 2242 of the apparatus 2202 of FIG. 22.

In some examples, a PRI in a last downlink grant may indicate a second PUCCH resource for the UE to use for the A-CSI report multiplexed with the one or more HARQ-ACK feedback, as described in connection with the second downlink grant 1012 of FIG. 10.

In some examples, the base station may transmit (e.g., at 2104) multiple PRI values in each downlink grant, as described in connection with the HARQ PRI field 1052 and the CSI PRI field 1054 of FIG. 10. For example, the base station may indicate a first PRI value associated with the one or more HARQ-ACK feedback and a second PRI value associated with the A-CSI report. In such examples, the base station may receive, at 2112, the A-CSI report multiplexed with the one or more HARQ-ACK feedback based on a last indicated PRI value among the first PRI value and the second PRI value, as described in connection with the multiplexed aperiodic CSI and HARQ feedback 1020 of FIG. 10 and/or the CSI report with multiplexed HARQ feedback 1244 of FIG. 12. The receiving of the A-CSI report multiplexed with the one or more HARQ-ACK feedback, at 2112, may be performed, for example, by the report component 2244 of the apparatus 2202 of FIG. 22.

In some examples, the receiving of the A-CSI report and the HARQ-ACK feedback may be based on DAIs, as described in connection with the HARQ DAI fields 1057 and the CSI DAI fields 1061 of FIG. 10. For example, the base station may transmit a first counter DAI associated with the A-CSI report, a first total DAI associated with the A-CSI report, a second counter DAI associated with the one or more HARQ-ACK feedback, and a second total DAI associated with the one or more HARQ-ACK feedback.

In some examples, the CSI report may include a concatenation of the one or more HARQ-ACK feedback based on a first codebook and the A-CSI report based on a second codebook, as described in connection with the HARQ-ACK codebook 1021 and the aperiodic CSI codebook 1022 of FIG. 10.

As illustrated at 2108, the base station may transmit a downlink control channel scheduling a first HARQ-ACK feedback, as described in connection with the DCI 1150 of FIG. 11 and/or the DCI 1226 of FIG. 12. The base station may transmit the downlink control channel scheduling the first HARQ-ACK feedback after transmitting the downlink grant scheduling the UE to provide the A-CSI report (e.g., at 2104). The transmitting of the downlink control channel scheduling the first HARQ-ACK feedback, at 2108, may be performed by a HARQ-ACK component 2246 and/or the transmission component 2234 of the apparatus 2202 of FIG. 22.

In some examples, the downlink control channel scheduling the first HARQ-ACK feedback may include an indication to multiplex the one or more HARQ-ACK feedback with the A-CSI report, as described in connection with the multiplexing field 1154 of FIG. 11.

In some examples, a third PUCCH resource associated with the first HARQ-ACK feedback may be indicated by a HARQ-ACK PRI in a last PDCCH that schedules the first HARQ-ACK feedback, as described in connection with the HARQ PRI field 1152 of FIG. 11.

Figure 22:
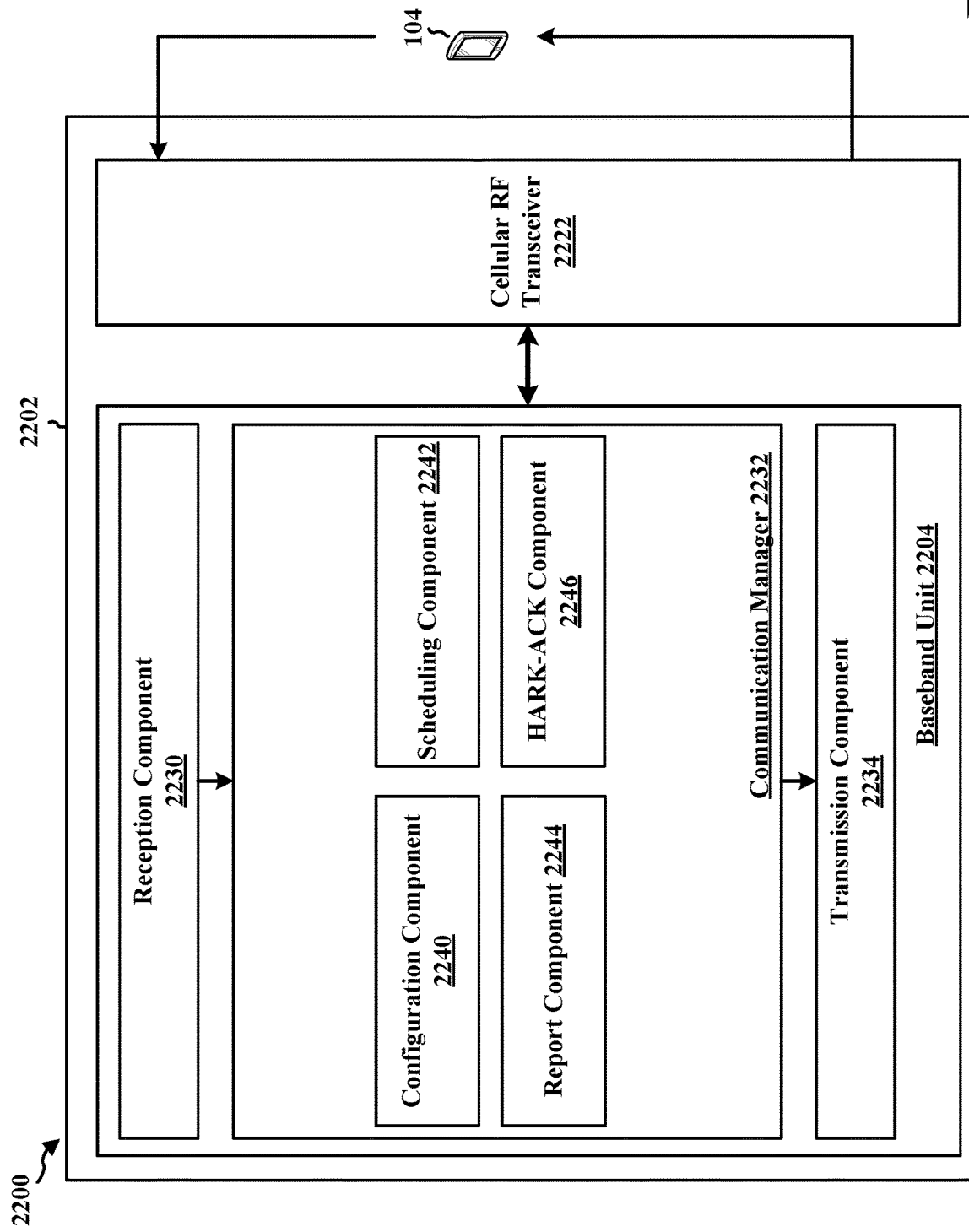
FIG. 22 is a diagram illustrating an example of a hardware implementation for an example apparatus, in accordance with the teachings disclosed herein.

FIG. 22 is a diagram 2200 illustrating an example of a hardware implementation for an apparatus 2202. The apparatus 2202 may be a base station, a component of a base station, or may implement base station functionality. In some aspects, the apparatus 2202 may include a baseband unit 2204. The baseband unit 2204 may communicate through a cellular RF transceiver 2222 with the UE 104. The baseband unit 2204 may include a computer-readable medium/memory. The baseband unit 2204 is responsible for general processing, including the execution of software stored on the computer-readable medium/memory. The software, when executed by the baseband unit 2204, causes the baseband unit 2204 to perform the various functions described supra. The computer-readable medium/memory may also be used for storing data that is manipulated by the baseband unit 2204 when executing software. The baseband unit 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the baseband unit 2204. The baseband unit 2204 may be a component of the base station 310 and may include the memory 376 and/or at least one of the TX processor 316, the RX processor 370, and the controller/processor 375.

The communication manager 2232 includes a configuration component 2240 that is configured to transmit an RRC configuration to a UE excluding a parameter that enables CSI multiplexing, for example, as described in connection with 1902 of FIG. 19. The example configuration component 2240 may also be configured to transmit an RRC configuration with a parameter that enables CSI multiplexing, for example, as described in connection with 2102 of FIG. 21.

The communication manager 2232 also includes a scheduling component 2242 that is configured to schedule the UE to provide multiple A-CSI reports while foregoing A-CSI multiplexing, for example, as described in connection with 1802 of FIG. 18 and/or 1904 of FIG. 19. The example scheduling component 2242 may also be configured to schedule up to two A-CSI reports in a same slot for the UE, the multiple A-CSI reports being non-overlapping in time in the same slot, for example, as described in connection with 1804 of FIG. 18 and/or 1906 of FIG. 19. The example scheduling component 2242 may also be configured to transmit a downlink grant scheduling the UE to provide an A-CSI report, the downlink grant including at least one of a counter DAI associated with the A-CSI report and a total DAI associated with the A-CSI report, for example, as described in connection with 2002 of FIG. 20 and/or 2104 of FIG. 21. The example scheduling component 2242 may also be configured to transmit scheduling to multiplex the A-CSI report with one or more HARQ-ACK feedback, for example, as described in connection with 2106 of FIG. 21.

The communication manager 2232 also includes a report component 2244 that is configured to receive, from the UE, the multiple A-CSI reports in respective PUCCH, for example, as described in connection with 1806 of FIG. 18 and/or 1908 of FIG. 19. The example report component 2244 may also be configured to receive a CSI report from the UE in a PUCCH based on the downlink grant, for example, as described in connection with 2004 of FIG. 20 and/or 2110 of FIG. 21. The example report component 2244 may also be configured to receive the A-CSI report multiplexed with the one or more HARQ-ACK feedback, for example, as described in connection with 2112 of FIG. 21.

The communication manager 2232 also includes a HARQ-ACK component 2246 that is configured to transmit a downlink control channel scheduling a first HARQ-ACK feedback, for example, as described in connection with 2108 of FIG. 21.

The apparatus may include additional components that perform each of the blocks of the algorithm in the flowcharts of FIGS. 18, 19, 20, and/or 21. As such, each block in the flowcharts of FIGS. 18, 19, 20, and/or 21 may be performed by a component and the apparatus may include one or more of those components. The components may be one or more of hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the baseband unit 2204, includes means for scheduling a UE to provide multiple A-CSI reports while foregoing A-CSI multiplexing. The example apparatus 2202 also includes means for scheduling up to two A-CSI reports in a same slot for the UE, the multiple A-CSI reports being non-overlapping in time in the same slot. The example apparatus 2202 also includes means for receiving, from the UE, the multiple A-CSI reports in respective PUCCH.

In another configuration, the example apparatus 2202 also includes means for transmitting an RRC configuration to the UE excluding a parameter that enables CSI multiplexing.

In another configuration, the apparatus 2202, and in particular the baseband unit 2204, includes means for transmitting a downlink grant scheduling a UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource. The example apparatus 2202 also includes means for receiving a CSI report from the UE in a PUCCH based on the downlink grant.

In another configuration, the example apparatus 2202 also includes means for transmitting a radio resource control configuration to the UE with a parameter that enables CSI multiplexing, the parameter indicating one or more PUCCH resources to use to transmit multiplexed A-CSI reports.

In another configuration, the example apparatus 2202 also includes means for transmitting scheduling to multiplex the A-CSI report with one or more HARQ-ACK feedback.

In another configuration, the example apparatus 2202 also includes means for indicating multiple PRI values in each downlink grant, a first PRI value associated with the one or more HARQ-ACK feedback and a second PRI value associated with the A-CSI report, and receiving the A-CSI report multiplexed with the one or more HARQ-ACK feedback from the UE based on a last indicated PRI value among the first PRI value and the second PRI value.

In another configuration, the example apparatus 2202 also includes means for indicating, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and where the CSI report includes a concatenation of the one or more HARQ-ACK feedback based on a first codebook and the A-CSI report based on a second codebook.

In another configuration, the example apparatus 2202 also includes means for transmitting a downlink control channel scheduling a first HARQ-ACK feedback after transmitting the downlink grant scheduling the UE to provide the A-CSI report, the downlink control channel scheduling the first HARQ-ACK feedback including an indication to multiplex the one or more HARQ-ACK feedback with the A-CSI report.

The means may be one or more of the components of the apparatus 2202 configured to perform the functions recited by the means. As described supra, the apparatus 2202 may include the TX processor 316, the RX processor 370, and the controller/processor 375. As such, in one configuration, the means may be the TX processor 316, the RX processor 370, and the controller/processor 375 configured to perform the functions recited by the means.

Example techniques disclosed herein enable a UE to provide downlink grant-triggered A-CSI feedback on an uplink control channel (e.g., a PUCCH). Using PUCCH to provide A-CSI feedback may be faster than A-CSI reporting on PUSCH and may provide the base station with more up-to-date CSI information. Using PUCCH to provide A-CSI feedback may also reduce latency and increase reliability.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE comprising: receiving scheduling to provide multiple A-CSI reports while foregoing A-CSI multiplexing, the scheduling for up to two A-CSI reports in a same slot for the UE, and the multiple A-CSI reports being non-overlapping in time in the same slot; and transmitting the multiple A-CSI reports to a base station in respective PUCCH in the same slot and while foregoing CSI multiplexing.

Aspect 2 is the method of aspect 1, further including: receiving an RRC configuration from the base station excluding a parameter that enables CSI multiplexing.

Aspect 3 is the method of any of aspects 1 and 2, further including that the RRC configuration excludes a multiplexing CSI PUCCH resource parameter indicating one or more PUCCH resources configured for the UE.

Aspect 4 is an apparatus for wireless communication at a UE including at least one processor coupled to a memory and configured to implement any of aspects 1 to 3.

Aspect 5 is an apparatus for wireless communication including means for implementing any of aspects 1 to 3.

Aspect 6 is a non-transitory computer-readable storage medium storing computer executable code, where the code, when executed, causes a processor to implement any of aspects 1 to 3.

Aspect 7 is a method of wireless communication at a base station comprising scheduling a UE to provide multiple A-CSI reports while foregoing A-CSI multiplexing; scheduling up to two A-CSI reports in a same slot for the UE, the multiple A-CSI reports being non-overlapping in time in the same slot; and receiving, from the UE, the multiple A-CSI reports in respective PUCCH.

Aspect 8 is the method of aspect 7, further including: transmitting an RRC configuration to the UE excluding a parameter that enables CSI multiplexing.

Aspect 9 is the method of any of aspects 7 and 8, further including that the RRC configuration excludes a multiplexing CSI PUCCH resource parameter indicating one or more PUCCH resources configured for the UE.

Aspect 10 is an apparatus for wireless communication at a base station including at least one processor coupled to a memory and configured to implement any of aspects 7 to 9.

Aspect 11 is an apparatus for wireless communication including means for implementing any of aspects 7 to 9.

Aspect 12 is a non-transitory computer-readable storage medium storing computer executable code, where the code, when executed, causes a processor to implement any of aspects 7 to 9.

Aspect 13 is a method of wireless communication at a UE comprising receiving a downlink grant scheduling the UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource; and transmitting a CSI report to a base station in a PUCCH based on the downlink grant.

Aspect 14 is the method of aspect 13, further including that a total DAI codepoint indicates that CSI multiplexing is being scheduled for the UE, the CSI multiplexing including multiplexing the A-CSI report with a second A-CSI report.

Aspect 15 is the method of any of aspects 13 and 14, further including that a combination of the total DAI codepoint and the counter DAI indicate at least one of that the CSI multiplexing is being scheduled for the UE, and an amount of CSI reports to multiplex in a same PUCCH transmission.

Aspect 16 is the apparatus of any of aspects 13 to 15, further including that the downlink grant includes at least one bit that indicates that CSI multiplexing is being scheduled for the UE, the CSI multiplexing including multiplexing the A-CSI report with a second A-CSI report.

Aspect 17 is the apparatus of any of aspects 13 to 16, further including: receiving a radio resource control configuration including a parameter that enables CSI multiplexing, the parameter enabling the CSI multiplexing indicating one or more PUCCH resources associated with the UE to use to transmit multiplexed CSI reports.

Aspect 18 is the apparatus of any of aspects 13 to 17, further including that the PUCCH resource is included in the one or more PUCCH resources, and the PUCCH resource is selected based on a payload size of the multiplexed CSI reports.

Aspect 19 is the apparatus of any of aspects 13 to 18, further including: receiving scheduling to multiplex the A-CSI report with one or more HARQ-ACK feedback.

Aspect 20 is the apparatus of any of aspects 13 to 19, further including that a PUCCH resource indicator in a last downlink grant indicates a second PUCCH resource associated with the A-CSI report multiplexed with the one or more HARQ-ACK feedback.

Aspect 21 is the apparatus of any of aspects 13 to 20, further including that the UE receives, in each downlink grant, multiple PRI values, a first PRI value associated with the one or more HARQ-ACK feedback and a second PRI value associated with the A-CSI report, and wherein the UE transmits the A-CSI report multiplexed with the one or more HARQ-ACK feedback based on a last indicated PRI value among the first PRI value and the second PRI value.

Aspect 22 is the apparatus of any of aspects 13 to 21, further including that the UE receives, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and wherein the CSI report includes a concatenation of the one or more HARQ-ACK feedback based on a first codebook and the A-CSI report based on a second codebook.

Aspect 23 is the apparatus of any of aspects 13 to 22, further including: receiving a downlink control channel scheduling a first HARQ-ACK feedback after receiving the downlink grant scheduling the UE to provide the A-CSI report, the downlink control channel scheduling the first HARQ-ACK feedback including an indication to multiplex the one or more HARQ-ACK feedback with the A-CSI report.

Aspect 24 is the apparatus of any of aspects 13 to 23, further including that a third PUCCH resource associated with the first HARQ-ACK feedback is indicated by a HARQ-ACK PUCCH resource indicator in a last physical downlink control channel that schedules the first HARQ-ACK feedback.

Aspect 25 is an apparatus for wireless communication at a UE including at least one processor coupled to a memory and configured to implement any of aspects 13 to 24.

Aspect 26 is an apparatus for wireless communication including means for implementing any of aspects 13 to 24.

Aspect 27 is a non-transitory computer-readable storage medium storing computer executable code, where the code, when executed, causes a processor to implement any of aspects 13 to 24.

Aspect 28 is a method of wireless communication at a base station comprising: transmitting a downlink grant scheduling a UE to provide an A-CSI report, the downlink grant including at least one of a counter DAI associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a PUCCH resource; and receiving a CSI report from the UE in a PUCCH based on the downlink grant.

Aspect 29 is the method of aspect 28, further including that a total DAI codepoint indicates that CSI multiplexing is being scheduled for the UE, the CSI multiplexing including multiplexing the A-CSI report with a second A-CSI report.

Aspect 30 is the method of any of aspects 28 and 29, further including that a combination of the total DAI codepoint and the counter DAI indicate at least one of that the CSI multiplexing is being scheduled for the UE, and an amount of CSI reports to multiplex in a same PUCCH transmission.

Aspect 31 is the apparatus of any of aspects 28 to 30, further including that the downlink grant includes at least one bit that indicates that CSI multiplexing is being scheduled for the UE, the CSI multiplexing including multiplexing the A-CSI report with a second A-CSI report.

Aspect 32 is the apparatus of any of aspects 28 to 31, further including: transmitting a radio resource control configuration to the UE with a parameter that enables CSI multiplexing, the parameter indicating one or more PUCCH resources to use to transmit multiplexed A-CSI reports.

Aspect 33 is the apparatus of any of aspects 28 to 32, further including that the PUCCH resource is included in the one or more PUCCH resources, and the PUCCH resource accommodates a payload size of the multiplexed A-CSI reports.

Aspect 34 is the apparatus of any of aspects 28 to 33, further including: transmitting scheduling to multiplex the A-CSI report with one or more HARQ-ACK feedback.

Aspect 35 is the apparatus of any of aspects 28 to 34, further including that a PUCCH resource indicator in a last downlink grant indicates a second PUCCH resource associated with the A-CSI report multiplexed with the one or more HARQ-ACK feedback.

Aspect 36 is the apparatus of any of aspects 28 to 35, further including that the base station indicates multiple PRI values in each downlink grant, a first PRI value associated with the one or more HARQ-ACK feedback and a second PRI value associated with the A-CSI report, and wherein the base station receives the A-CSI report multiplexed with the one or more HARQ-ACK feedback from the UE based on a last indicated PRI value among the first PRI value and the second PRI value.

Aspect 37 is the apparatus of any of aspects 28 to 36, further including that the base station indicates, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and wherein the CSI report includes a concatenation of the one or more HARQ-ACK feedback based on a first codebook and the A-CSI report based on a second codebook.

Aspect 38 is the apparatus of any of aspects 28 to 37, further including: transmitting a downlink control channel scheduling a first HARQ-ACK feedback after transmitting the downlink grant scheduling the UE to provide the A-CSI report, the downlink control channel scheduling the first HARQ-ACK feedback including an indication to multiplex the one or more HARQ-ACK feedback with the A-CSI report.

Aspect 39 is the apparatus of any of aspects 28 to 38, further including that a third PUCCH resource associated with the first HARQ-ACK feedback is indicated by a HARQ-ACK PUCCH resource indicator in a last physical downlink control channel that schedules the first HARQ-ACK feedback.

Aspect 40 is an apparatus for wireless communication at a base station including at least one processor coupled to a memory and configured to implement any of aspects 28 to 39.

Aspect 41 is an apparatus for wireless communication including means for implementing any of aspects 28 to 39.

Aspect 42 is a non-transitory computer-readable storage medium storing computer executable code, where the code, when executed, causes a processor to implement any of aspects 28 to 39.

What is claimed is:

1. A method of wireless communication at a user equipment (UE), comprising:
   receiving a downlink grant scheduling the UE to provide an aperiodic channel state information (CSI) (A-CSI) report, the downlink grant including at least one of a counter downlink assignment indicator (DAI) associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a physical uplink control channel (PUCCH) resource; and
   transmitting a CSI report to a base station in a PUCCH based on the downlink grant.

2. The method of claim 1, wherein a total DAI codepoint indicates that CSI multiplexing is being scheduled for the UE, the CSI multiplexing including multiplexing the A-CSI report with a second A-CSI report.

3. The method of claim 2, wherein a combination of the total DAI codepoint and the counter DAI indicate at least one of
that the CSI multiplexing is being scheduled for the UE, and
an amount of CSI reports to multiplex in a same PUCCH transmission.

4. The method of claim 1, wherein the downlink grant includes at least one bit that indicates that CSI multiplexing is being scheduled for the UE, the CSI multiplexing including multiplexing the A-CSI report with a second A-CSI report.

5. The method of claim 1, further comprising:
receiving a radio resource control configuration including a parameter that enables CSI multiplexing, the parameter enabling the CSI multiplexing indicating one or more PUCCH resources associated with the UE to use to transmit multiplexed CSI reports.

6. The method of claim 5, wherein the PUCCH resource is included in the one or more PUCCH resources, and the PUCCH resource is selected based on a payload size of the multiplexed CSI reports.

7. The method of claim 1, further comprising:
receiving scheduling to multiplex the A-CSI report with one or more hybrid automatic repeat request acknowledgement (HARQ-ACK) feedback.

8. The method of claim 7, wherein a PUCCH resource indicator in a last downlink grant indicates a second PUCCH resource associated with the A-CSI report multiplexed with the one or more HARQ-ACK feedback.

9. The method of claim 7, wherein the UE receives, in each downlink grant, multiple PUCCH resource indicator (PRI) values, a first PRI value associated with the one or more HARQ-ACK feedback and a second PRI value associated with the A-CSI report, and wherein the UE transmits the A-CSI report multiplexed with the one or more HARQ-ACK feedback based on a last indicated PRI value among the first PRI value and the second PRI value.

10. The method of claim 7, wherein the UE receives, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and wherein the CSI report includes a concatenation of the one or more HARQ-ACK feedback based on a first codebook and the A-CSI report based on a second codebook.

11. The method of claim 7, further comprising:
receiving a downlink control channel scheduling a first HARQ-ACK feedback after receiving the downlink grant scheduling the UE to provide the A-CSI report, the downlink control channel scheduling the first HARQ-ACK feedback including an indication to multiplex the one or more HARQ-ACK feedback with the A-CSI report.

12. The method of claim 11, wherein a third PUCCH resource associated with the first HARQ-ACK feedback is indicated by a HARQ-ACK PUCCH resource indicator in a last physical downlink control channel that schedules the first HARQ-ACK feedback.

13. The apparatus of claim 1, further comprising:
at least one transceiver coupled to the at least one processor, wherein the at least one processor is configured to:
receive scheduling to multiplex the A-CSI report with one or more hybrid automatic repeat request acknowledgement (HARQ-ACK) feedback.

14. The apparatus of claim 13, wherein the at least one processor is further configured to:
receive a downlink control channel scheduling a first HARQ-ACK feedback after receiving the downlink grant scheduling the UE to provide the A-CSI report, the downlink control channel scheduling the first HARQ-ACK feedback including an indication to multiplex the one or more HARQ-ACK feedback with the A-CSI report.

15. A method of wireless communication at a base station, comprising:
transmitting a downlink grant scheduling a user equipment (UE) to provide an aperiodic channel state information (A-CSI) report, the downlink grant including at least one of a counter downlink assignment indicator (DAI) associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a physical uplink control channel (PUCCH) resource; and
receiving a CSI report from the UE in a PUCCH based on the downlink grant.

16. The method of claim 15, wherein a total DAI codepoint indicates that CSI multiplexing is being scheduled for the UE, the CSI multiplexing including multiplexing the A-CSI report with a second A-CSI report.

17. The method of claim 16, wherein a combination of the total DAI codepoint and the counter DAI indicate at least one of
that the CSI multiplexing is being scheduled for the UE, and
an amount of CSI reports to multiplex in a same PUCCH transmission.

18. The method of claim 15, wherein the downlink grant includes at least one bit that indicates that CSI multiplexing is being scheduled for the UE, the CSI multiplexing including multiplexing the A-CSI report with a second A-CSI report.

19. The method of claim 15, further comprising:
transmitting a radio resource control configuration to the UE with a parameter that enables CSI multiplexing, the parameter indicating one or more PUCCH resources to use to transmit multiplexed A-CSI reports.

20. The method of claim 19, wherein the PUCCH resource is included in the one or more PUCCH resources, and the PUCCH resource accommodates a payload size of the multiplexed A-CSI reports.

21. The method of claim 15, further comprising:
transmitting scheduling to multiplex the A-CSI report with one or more hybrid automatic repeat request acknowledgement (HARQ-ACK) feedback.

22. The method of claim 21, wherein a PUCCH resource indicator in a last downlink grant indicates a second PUCCH resource associated with the A-CSI report multiplexed with the one or more HARQ-ACK feedback.

23. The method of claim 21, wherein the base station indicates multiple PUCCH resource indicator (PRI) values in each downlink grant, a first PRI value associated with the one or more HARQ-ACK feedback and a second PRI value associated with the A-CSI report, and wherein the base station receives the A-CSI report multiplexed with the one or more HARQ-ACK feedback from the UE based on a last indicated PRI value among the first PRI value and the second PRI value.

24. The method of claim 21, wherein the base station indicates, in each downlink grant, a first counter DAI associated with the A-CSI report, a first total DAI associated with the A-CSI report, a second counter DAI associated with the one or more HARQ-ACK feedback, and a second total DAI associated with the one or more HARQ-ACK feedback, and wherein the CSI report includes a concatenation of the one or more HARQ-ACK feedback based on a first codebook and the A-CSI report based on a second codebook.

25. The method of claim 21, further comprising:
transmitting a downlink control channel scheduling a first HARQ-ACK feedback after transmitting the downlink grant scheduling the UE to provide the A-CSI report, the downlink control channel scheduling the first HARQ-ACK feedback including an indication to multiplex the one or more HARQ-ACK feedback with the A-CSI report.

26. The method of claim 25, wherein a third PUCCH resource associated with the first HARQ-ACK feedback is indicated by a HARQ-ACK PUCCH resource indicator in a last physical downlink control channel that schedules the first HARQ-ACK feedback.

27. An apparatus for wireless communication at a user equipment (UE), comprising:
a memory; and
at least one processor coupled to the memory, the at least one processor configured to:
receive a downlink grant scheduling the UE to provide an aperiodic channel state information (CSI) (A-CSI) report, the downlink grant including at least one of a counter downlink assignment indicator (DAI) associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a physical uplink control channel (PUCCH) resource; and
transmit a CSI report to a base station in a PUCCH based on the downlink grant.

28. An apparatus for wireless communication at a base station, comprising:
a memory; and
at least one processor coupled to the memory, the at least one processor configured to:
transmit a downlink grant scheduling a user equipment (UE) to provide an aperiodic channel state information (A-CSI) report, the downlink grant including at least one of a counter downlink assignment indicator (DAI) associated with the A-CSI report and a total DAI associated with the A-CSI report, the counter DAI indicating an index of the A-CSI report in an A-CSI codebook for multiplexing multiple A-CSI reports, and the total DAI indicating a total number of A-CSI reports to multiplex in a physical uplink control channel (PUCCH) resource; and
receive a CSI report from the UE in a PUCCH based on the downlink grant.

29. The apparatus of claim 28, further comprising:
at least one transceiver coupled to the at least one processor, wherein the at least one processor is configured to:
transmit scheduling to multiplex the A-CSI report with one or more hybrid automatic repeat request acknowledgement (HARQ-ACK) feedback.

30. The apparatus of claim 29, wherein the at least one processor is further configured to:
transmit a downlink control channel scheduling a first HARQ-ACK feedback after transmitting the downlink grant scheduling the UE to provide the A-CSI report, the downlink control channel scheduling the first HARQ-ACK feedback including an indication to multiplex the one or more HARQ-ACK feedback with the A-CSI report.

\* \* \* \* \*